United States Patent
Iwama et al.

(10) Patent No.: US 9,691,547 B2
(45) Date of Patent: Jun. 27, 2017

(54) MULTILAYER CERAMIC CAPACITOR

(71) Applicant: TDK CORPORATION, Tokyo (JP)

(72) Inventors: Masahiro Iwama, Nikaho (JP); Kenya Tamaki, Tokyo (JP); Fumiaki Satoh, Tokyo (JP); Kenta Yamashita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 73 days.

(21) Appl. No.: 14/959,229

(22) Filed: Dec. 4, 2015

(65) Prior Publication Data

US 2016/0163454 A1 Jun. 9, 2016

(30) Foreign Application Priority Data

Dec. 9, 2014 (JP) ................................. 2014-248655

(51) Int. Cl.
| | |
|---|---|
| *H01G 4/012* | (2006.01) |
| *H01G 4/30* | (2006.01) |
| *H01G 4/224* | (2006.01) |
| *H01G 4/228* | (2006.01) |
| *H01G 4/38* | (2006.01) |
| *H01G 4/12* | (2006.01) |

(52) U.S. Cl.
CPC ............. *H01G 4/012* (2013.01); *H01G 4/224* (2013.01); *H01G 4/228* (2013.01); *H01G 4/30* (2013.01); *H01G 4/385* (2013.01); *H01G 4/12* (2013.01)

(58) Field of Classification Search
None
See application file for complete search history.

(56) References Cited

U.S. PATENT DOCUMENTS

| | | | | |
|---|---|---|---|---|
| 4,556,929 A | * | 12/1985 | Tanaka | H01G 4/005 361/321.2 |
| 5,978,204 A | * | 11/1999 | Stevenson | A61N 1/3754 361/303 |
| 8,373,964 B2 | * | 2/2013 | Ahn | H01G 4/005 361/301.4 |
| 2007/0025054 A1 | * | 2/2007 | Tonogai | H01G 4/30 361/303 |
| 2011/0149466 A1 | * | 6/2011 | Hwang | H01G 4/012 361/303 |

FOREIGN PATENT DOCUMENTS

JP     H10-22160 A     1/1998

* cited by examiner

*Primary Examiner* — Dion R Ferguson
(74) *Attorney, Agent, or Firm* — Oliff PLC

(57) ABSTRACT

A multilayer ceramic capacitor includes an element body, a first terminal electrode, a second terminal electrode, a plurality of first internal electrode groups, and a plurality of second internal electrode groups. The plurality of first internal electrode groups each include a first number of first internal electrodes connected to the first terminal electrode and arranged in the first direction inside the element body. The plurality of second internal electrode groups each include a second number of second internal electrodes connected to the second terminal electrode and arranged in the first direction inside the element body. The first internal electrode groups and the second internal electrode groups are arranged alternately in the first direction. One of first internal electrodes included in each of the first internal electrode groups and one of second internal electrodes included in each of the second internal electrode groups are opposed to each other.

6 Claims, 11 Drawing Sheets

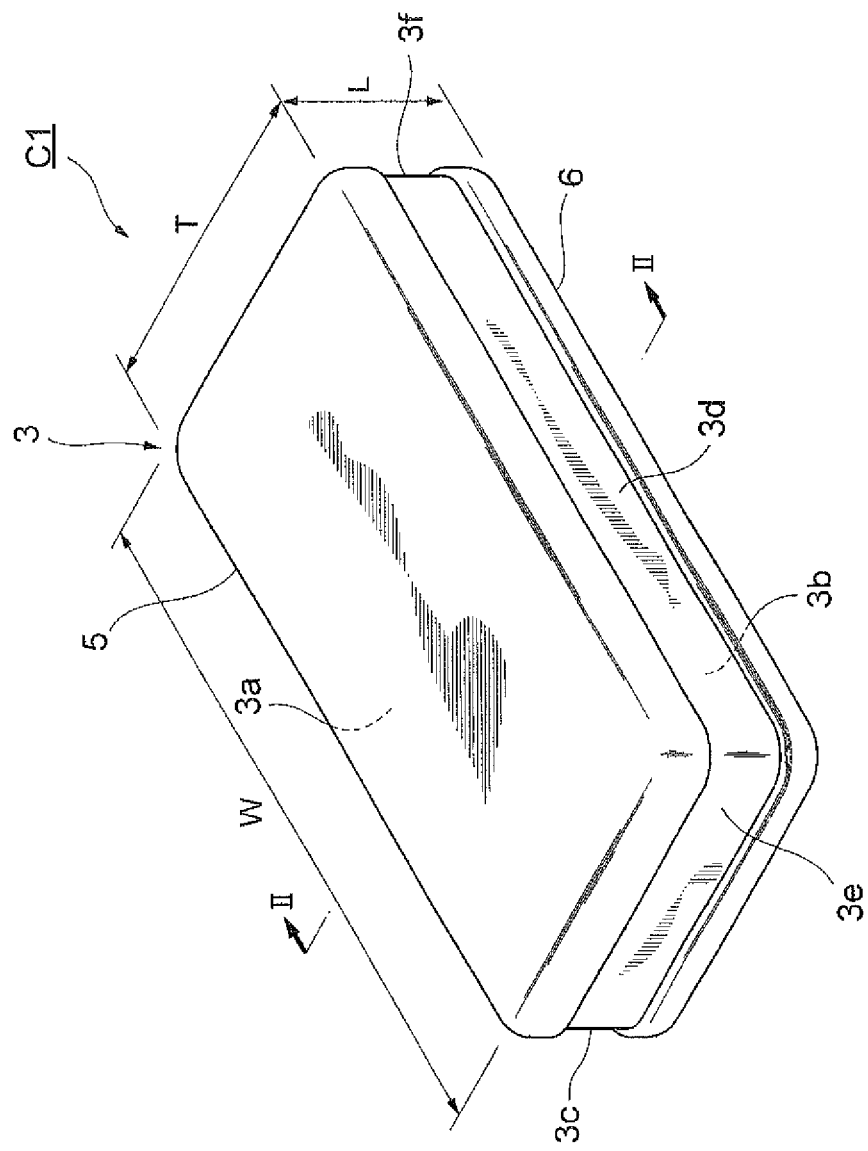
Fig.1
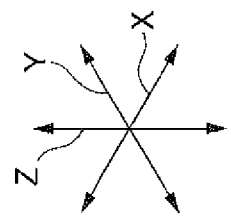

MULTILAYER CERAMIC CAPACITOR

TECHNICAL FIELD

The present invention relates to a multilayer ceramic capacitor.

BACKGROUND

Known multilayer ceramic capacitors include an element body including a dielectric, a first terminal electrode, a second terminal electrode, and a plurality of internal electrodes (for example, Japanese Unexamined Patent Publication No. H10-22160 (hereinafter referred to as Patent Document 1)). The element body includes a first main surface, a second main surface, a first side surface, a second side surface, a third side surface, and a fourth side surface. The first main surface and the second main surface extend in a first direction and a second direction intersecting the first direction, and are opposed to each other. The first side surface and the second side surface extend in the second direction and in a third direction that is a direction in which the first main surface and the second main surface are opposed to each other to connect between the first main surface and the second main surface, and are opposed to each other. The third side surface and the fourth side surface extend in the first direction and the third direction to connect the first main surface and the second main surface, and are opposed to each other. The first terminal electrode is arranged on the first main surface. The second terminal electrode is arranged on the second main surface. The plurality of internal electrodes are arranged so as to be opposed to each other inside the element body.

In the multilayer ceramic capacitor described in Patent Document 1, the plurality of internal electrodes arranged inside the element body include a plurality of first internal electrodes connected to the first terminal electrode, and a plurality of second internal electrodes connected to the second terminal electrode. The first internal electrodes and the second internal electrodes are arranged alternately to be adjacent to each other. Since the first internal electrodes and the second internal electrodes connected to the terminal electrodes having different polarities are opposed to each other, capacitance is caused between the first internal electrodes and the second internal electrodes.

SUMMARY

In the multilayer ceramic capacitor described in Patent Document 1, numbers of the first internal electrodes and the second internal electrodes required to ensure desired capacitance are arranged in only a central portion in the first direction inside the element body. That is, in the element body, a region of the dielectric on the outer side in which the plurality of internal electrodes are not arranged is wider than a region in which the plurality of internal electrodes are arranged. In such a case, cracks are likely to occur inside the element body.

For example, there is a difference in thermal shrinkage caused in an element-body firing process between a material for making the plurality of internal electrodes and a material for making the dielectric. In the multilayer ceramic capacitor described in Patent Document 1, since the region of the dielectric in which the plurality of internal electrodes are not arranged is wider than the region in which the plurality of internal electrodes are arranged, cracks are likely to occur due to the difference in thermal shrinkage.

An object of the present invention is to provide a multilayer ceramic capacitor capable of suppressing occurrence of cracks while ensuring desired capacitance.

A multilayer ceramic capacitor according to an aspect of the present invention includes an element body including a dielectric, a first terminal electrode, a second terminal electrode, a plurality first internal electrode groups, and a plurality of second internal electrode groups. The element body includes a first main surface, a second main surface, a first side surface, a second side surface, a third side surface, and a fourth side surface. The first main surface and the second main surface extend in a first direction and a second direction intersecting the first direction, and are opposed to each other. The first side surface and the second side surface extend in the second direction and in a third direction that is a direction in which the first main surface and the second main surface are opposed to each other to connect the first main surface and the second main surface, and are opposed to each other. The third side surface and the fourth side surface extend in the first direction and the third direction to connect the first main surface and the second main surface, and are opposed to each other. The first terminal electrode is arranged on the first main surface. The second terminal electrode is arranged on the second main surface. The plurality of first internal electrode groups each include a first number of first internal electrodes. The first numbers of first internal electrodes are connected to the first terminal electrode and arranged in the first direction inside the element body. The plurality of second internal electrode groups each include a second number of second internal electrodes. The second numbers of second internal electrodes are connected to the second terminal electrode and arranged in the first direction inside the element body. A length in the first direction of the element body is greater than a length in the third direction of the element body and is smaller than or equal to a length in the second direction of the element body. A length in the second direction of the first internal electrode is greater than a length in the third direction of the first internal electrode. A length in the second direction of the second internal electrode is greater than a length in the third direction of the second internal electrode. The first number and the second number are different integers equal to or greater than 2. Intervals in the first direction between the first internal electrodes included in the first internal electrode groups, intervals in the first direction between the second internal electrodes included in the second internal electrode groups, and intervals in the first direction between the first internal electrodes included in the first internal electrode groups and the second internal electrodes included in the second internal electrode group are the same as one another. The first internal electrode groups and the second internal electrode groups are arranged alternately in the first direction so that one of first internal electrodes included in each of the first internal electrode groups and one of second internal electrodes included in each of the second internal electrode groups are opposed to each other in the first direction.

In the multilayer ceramic capacitor according to the aspect of the present invention, since the length in the first direction of the element body is greater than the length in the third direction and is smaller than or equal to the length in the second direction of the element body, the element body has a low profile. The first terminal electrode is arranged on the first main surface of the element body, and the second terminal electrode is arranged on the second main surface of the element body. Accordingly, the first main surface or the second main surface constitutes a mounting surface for other electronic devices. When the element body is configured by stacking a plurality of dielectric layers in the first direction parallel to the first main surface or the second main surface, a multilayer ceramic capacitor in which the element body has a low profile can be realized even when the number of layers increases.

One of first internal electrodes included in each of the first internal electrode groups and one of second internal electrodes included in each of the second internal electrode groups are opposed to each other in the first direction between the first internal electrode groups and the second internal electrode groups alternately arranged in the first direction. The first internal electrodes and the second internal electrodes opposed to each other in the first direction have different polarities. Capacitance is caused between the first internal electrodes and the second internal electrodes opposed to each other in the first direction.

The first number of first internal electrodes included in each of the first internal electrode groups all have the same polarity. In each of the first internal electrode groups, capacitance is not caused between the first internal electrodes located at both ends in the first direction among the first number of first internal electrodes.

The second number of second internal electrodes included in each of the second internal electrode groups all have the same polarity. In each of the second internal electrode groups, capacitance is not caused between the second internal electrodes located at both ends in the first direction among the second number of second internal electrodes.

The multilayer ceramic capacitor according to an aspect of the present invention includes an arrangement region in which a plurality of internal electrodes are arranged, and a non-arrangement region in which no internal electrodes are arranged. The arrangement region includes a plurality of regions causing capacitance, and a plurality of regions causing no capacitance. Desired capacitance can be ensured by the plurality of regions causing the capacitance. The regions causing no capacitance are included in the arrangement region. Therefore, the multilayer ceramic capacitor of the above aspect, for example, has a greater length in the first direction of the arrangement region and a smaller length in the first direction of the non-arrangement region than a multilayer ceramic capacitor in which the internal electrodes having different polarities are alternately arranged and that has the element body of the same size as and the same capacitance as the multilayer ceramic capacitor of the above aspect.

In the arrangement region, all the internal electrodes are arranged at the same intervals in the first direction. Therefore, in the arrangement region, it is difficult for cracks caused by a difference in thermal shrinkage to occur. In the multilayer ceramic capacitor of the above aspect, the arrangement region is large, that is, a region in which it is difficult for cracks caused by a difference in thermal shrinkage to occur is wider than in to the above-described comparison capacitor. Therefore, it is possible to suppress the occurrence of cracks caused by the difference in thermal shrinkage in the entire element body. The first number and the second number are different integers equal to or greater than 2. Therefore, a width in the first direction of regions causing no capacitance between the first numbers of first internal electrodes and a width in the first direction of regions causing no capacitance between the second numbers of second internal electrodes are equal to or greater than at least a width in the first direction of regions causing capacitance between the first internal electrodes and the second internal electrodes opposed to each other, and are different from each other.

Since the regions causing no capacitance have different widths, a non-arrangement region in the element body can be narrowed as much as possible. Accordingly, it is possible to further increase the width in the first direction of the arrangement region than in the element body of the above-described comparison capacitor without changing desired capacitance. That is, it is possible to further increase a percentage of a region in which it is difficult for cracks caused by the difference in thermal shrinkage to occur in the entire element body, as compared to the above-mentioned comparison capacitor. Accordingly, it is possible to further suppress the occurrence of cracks caused by the difference in thermal shrinkage.

Thus, it is possible to provide a multilayer ceramic capacitor capable of suppressing the occurrence of cracks while ensuring desired capacitance.

A multilayer ceramic capacitor according to another aspect of the present invention includes an element body including a dielectric; a first terminal electrode and a second terminal electrode; and a plurality of first internal electrode groups, a plurality of second internal electrode groups, a plurality of third internal electrode groups, and a plurality of fourth internal electrode groups. The element body includes a first main surface, a second main surface, a first side surface, a second side surface, a third side surface, and a fourth side surface. The first main surface and the second main surface extend in a first direction and a second direction intersecting the first direction, and are opposed to each other. The first side surface and the second side surface extend in the second direction and in a third direction that is a direction in which the first main surface and the second main surface are opposed to each other to connect the first main surface and the second main surface, and are opposed to each other. The third side surface and the fourth side surface extend in the first direction and the third direction to connect the first main surface and the second main surface, and are opposed to each other. The first terminal electrode is arranged on the first main surface. The second terminal electrode is arranged on the second main surface. The plurality of first internal electrode groups each include a first number of first internal electrodes. The first numbers of first internal electrodes are connected to the first terminal electrode and arranged in the first direction inside the element body. The plurality of second internal electrode groups each include a first number of second internal electrodes. The first numbers of second internal electrodes are connected to the second terminal electrode and arranged in the first direction inside the element body. The plurality of third internal electrode groups each include a second number of first internal electrodes. The second numbers of first internal electrodes are connected to the first terminal electrode and arranged in the first direction inside the element body. The plurality of fourth internal electrode groups each include a second number of second internal electrodes. The second numbers of second internal electrodes are connected to the second terminal electrode and arranged in the first direction inside the element body. A length in the first direction of the element body is greater than a length in the third direction of the element body and is smaller than or equal to a length in the second direction of the element body. A length in the second direction of the first internal electrodes is greater than a length in the third direction of the first internal electrodes. A length in the second direction of the second internal electrodes is greater than a length in the third direction of the second internal electrodes. The first number and the second number are different integers equal to or greater than 2. The element body includes an inner portion, and a pair of outer portions located with the inner portion interposed therebetween in the first direction. Intervals in the first direction between the first internal electrodes included in the first internal electrode groups, intervals in the first direction between the second internal electrodes included in the second internal electrode groups, intervals in the first direction between the first internal electrodes included in the first internal electrode groups and the second internal electrodes included in the second internal electrode groups, intervals in the first direction between the first internal electrodes included in the third internal electrode groups, intervals in the first direction between the second internal electrodes included in the fourth internal electrode groups, and intervals in the first direction between the first internal electrodes included in the third internal electrode groups and the second internal electrodes included in the fourth internal electrode groups are the same as one another. The first internal electrode groups and the second internal electrode groups are located in the pair of outer portions. One of first internal electrodes included in each of the first internal electrode groups and one of second internal electrodes included in each of the second internal electrode groups are arranged alternately in the first direction so as to be opposed to each other in the first direction. The third internal electrode groups and the fourth internal electrode groups are located in the inner portion. One of first internal electrodes included in each of the third internal electrode groups and one of second internal electrodes included in each of the fourth internal electrode groups are arranged alternately in the first direction so as to be opposed to each other in the first direction.

In the multilayer ceramic capacitor according to this aspect of the present invention, since the length in the first direction of the element body is greater than the length in the third direction and is smaller than or equal to the length in the second direction of the element body, the element body has a low profile. The first terminal electrode is arranged on the first main surface of the element body, and the second terminal electrode is arranged on the second main surface of the element body. Accordingly, the first main surface or the second main surface constitutes a mounting surface for other electronic devices. When the element body is configured by stacking a plurality of dielectric layers in the first direction parallel to the first main surface or the second main surface, a multilayer ceramic capacitor in which the element body has a low profile can be realized even when the number of layers increases.

One of first internal electrodes included in each of the first internal electrode groups and one of second internal electrodes included in each of the second internal electrode groups are opposed to each other in the first direction between the first internal electrode groups and the second internal electrode groups alternately arranged in the first direction. The first internal electrodes and the second internal electrodes opposed to each other in the first direction have different polarities. Capacitance is caused between the first internal electrodes and the second internal electrodes opposed to each other in the first direction.

The first number of first internal electrodes included in each of the first internal electrode groups all have the same polarity. In each of the first internal electrode groups, capacitance is not caused between the first internal electrodes located at both ends in the first direction among the first number of first internal electrodes. The first number of second internal electrodes included in each of the second internal electrode groups all have the same polarity. In each of the second internal electrode groups, capacitance is not caused between the second internal electrodes located at both ends in the first direction among the first number of second internal electrodes.

One of first internal electrodes included in each of the first internal electrode groups and one of second internal electrodes included in each of the second internal electrode groups are opposed to each other in the first direction between the third internal electrode groups and the fourth internal electrode groups alternately arranged in the first direction. The first internal electrodes and the second internal electrodes opposed to each other in the first direction have different polarities. Capacitance is caused between the first internal electrodes and the second internal electrodes opposed to each other in the first direction.

The second number of first internal electrodes included in each of the third internal electrode groups all have the same polarity. In each of the third internal electrode groups, capacitance is not caused between the first internal electrodes located at both ends in the first direction among the second number of first internal electrodes. The second number of second internal electrodes included in each of the fourth internal electrode groups all have the same polarity. In each of the fourth internal electrode groups, capacitance is not caused between the second internal electrodes located at both ends in the first direction among the second number of second internal electrodes.

The multilayer ceramic capacitor according to an aspect of the present invention includes an arrangement region in which a plurality of internal electrodes are arranged, and a non-arrangement region in which no internal electrodes are arranged. The arrangement region includes a plurality of regions causing capacitance, and a plurality of regions causing no capacitance. Desired capacitance can be ensured by the plurality of regions causing the capacitance. The regions causing no capacitance are included in the arrangement region. Therefore, the multilayer ceramic capacitor of the above aspect, for example, has a greater length in the first direction of the arrangement region and a smaller length in the first direction of the non-arrangement region than a multilayer ceramic capacitor in which the internal electrodes having different polarities are alternately arranged and that has the element body of the same size as and the same capacitance as the multilayer ceramic capacitor of the above aspect. In the arrangement region, all the internal electrodes are arranged at the same intervals in the first direction. Therefore, in the arrangement region, it is difficult for cracks caused by a difference in thermal shrinkage to occur. In the multilayer ceramic capacitor of the above aspect, the arrangement region is large, that is, a region in which it is difficult for cracks caused by a difference in thermal shrinkage to occur is wider than in the above-mentioned comparison capacitor. Therefore, it is possible to suppress the occurrence of cracks caused by the difference in thermal shrinkage in the entire element body.

In the arrangement region, all the internal electrodes are arranged at the same intervals in the first direction. Therefore, in the arrangement region, it is difficult for cracks caused by the difference in thermal shrinkage to occur. In the multilayer ceramic capacitor of the above aspect, the arrangement region is large, that is, a region in which it is difficult for the cracks caused by the difference in thermal shrinkage to occur is wider than in the above-mentioned comparison capacitor. Therefore, it is possible to suppress the occurrence of cracks caused by the difference in thermal shrinkage in the entire element body. The first number and the second number are different integers equal to or greater than 2. First region between two first internal electrodes in the first internal electrode group causes no capacitance, the two first internal electrodes being located on the outermost in the first direction. Second region between two second internal electrodes in the second internal electrode group causes no capacitance, the two second internal electrodes being located on the outermost in the first direction. Third region between two first internal electrodes in the third internal electrodes group causes no capacitance, the two first internal electrodes being located on the outermost in the first direction. Fourth region between two second internal electrodes in the fourth internal electrodes group causes no capacitance, the two second internal electrodes being located on the outermost in the first direction. A width in the first direction of each of the first region, the second region, the third region, and the fourth region is equal to or greater than at least a width in the first direction of the region causing capacitance between the first internal electrodes and the second internal electrodes opposed to each other. A width in the first direction of each of the first region and the second region differs from a width in the first direction of each of the third region and the fourth region.

Since the regions causing no capacitance have different widths, a non-arrangement region in the element body can be narrowed as much as possible. Accordingly, it is possible to further increase the width in the first direction of the arrangement region than in the above-mentioned comparison capacitor without changing desired capacitance. That is, it is possible to further increase a percentage of a region in which it is difficult for cracks caused by the difference in thermal shrinkage to occur in the entire element body, as compared to the above-mentioned comparison capacitor. Accordingly, it possible to further suppress the occurrence of cracks caused by the difference in thermal shrinkage.

Thus, it is possible to provide a multilayer ceramic capacitor capable of suppressing the occurrence of cracks while ensuring desired capacitance.

In the multilayer ceramic capacitor according to the above aspect, the first number may be at least one larger than the second number. In this case, the numbers of first internal electrodes included in the first internal electrode groups and second internal electrodes included in the second internal electrode groups are larger than the numbers of first internal electrodes included in the third internal electrode groups and second internal electrodes included in the fourth internal electrode groups. The first internal electrode groups and the second internal electrode groups are located in the outer portions of the element body, and the third internal electrode groups and the fourth internal electrode groups are located in the inner portion of the element body. That is, the number of internal electrodes included in each region causing no capacitance in the outer portions of the element body is larger than that in the inner portion of the element body. Therefore, even when cracks occur, for example, in the outer portions of the element body, it is possible to prevent the cracks from reaching the internal electrodes having different polarities that contribute to the capacitance.

In the multilayer ceramic capacitor according to the above aspect, the second number may be at least one larger than the first number. In this case, the numbers of first internal electrodes included in the third internal electrode groups and second internal electrodes included in the fourth internal electrode groups are larger than the numbers of first internal electrodes included in the first internal electrode groups and second internal electrodes included in the second internal electrode groups. The first internal electrode groups and the second internal electrode groups are located in the outer portions of the element body, and the third internal electrode groups and the fourth internal electrode groups are located in the inner portion of the element body. That is, the number of internal electrodes included in each region causing no capacitance in the inner portion of the element body is larger than that in the outer portions of the element body. Accordingly, it is possible to improve connectivity between the first and second internal electrodes and the first and second terminal electrodes in the inner portion of the element body that is not easily subjected to barrel polishing.

The multilayer ceramic capacitor according to the above aspect may further include an adjustment electrode. In this case, the adjustment electrode is arranged so as to be opposed to the first internal electrode located on the outermost layer in the first direction among the first number of first internal electrodes. The adjustment electrode is connected to the second terminal electrode and is not connected to the first terminal electrode. Capacitance is caused between the first internal electrode located on the outermost layer in the first direction among the first number of first internal electrodes and the adjustment electrode. Accordingly, a multilayer ceramic capacitor with finely adjusted capacitance can be obtained.

The multilayer ceramic capacitor according to another aspect may further include an adjustment electrode. In this case, the adjustment electrode is arranged so as to be opposed to the first internal electrode located on the outermost layer in the first direction among the first number of first internal electrodes. The adjustment electrode is connected to the second terminal electrode and is not connected to the first terminal electrode. Capacitance is caused between the first internal electrode located on the outermost layer in the first direction among the first number of first internal electrodes and the adjustment electrode. Accordingly, a multilayer ceramic capacitor with finely adjusted capacitance can be obtained.

BRIEF DESCRIPTION OF THE DRAWINGS

FIG. 1 is a perspective view illustrating a multilayer ceramic capacitor according to a first embodiment.

DETAILED DESCRIPTION

Hereinafter, embodiments of the present invention will be described in detail with reference to the accompanying drawings. In the following description, the same elements or elements having the same functions are denoted with the same reference signs, and repeated description will be omitted.

First Embodiment

Figure 2:
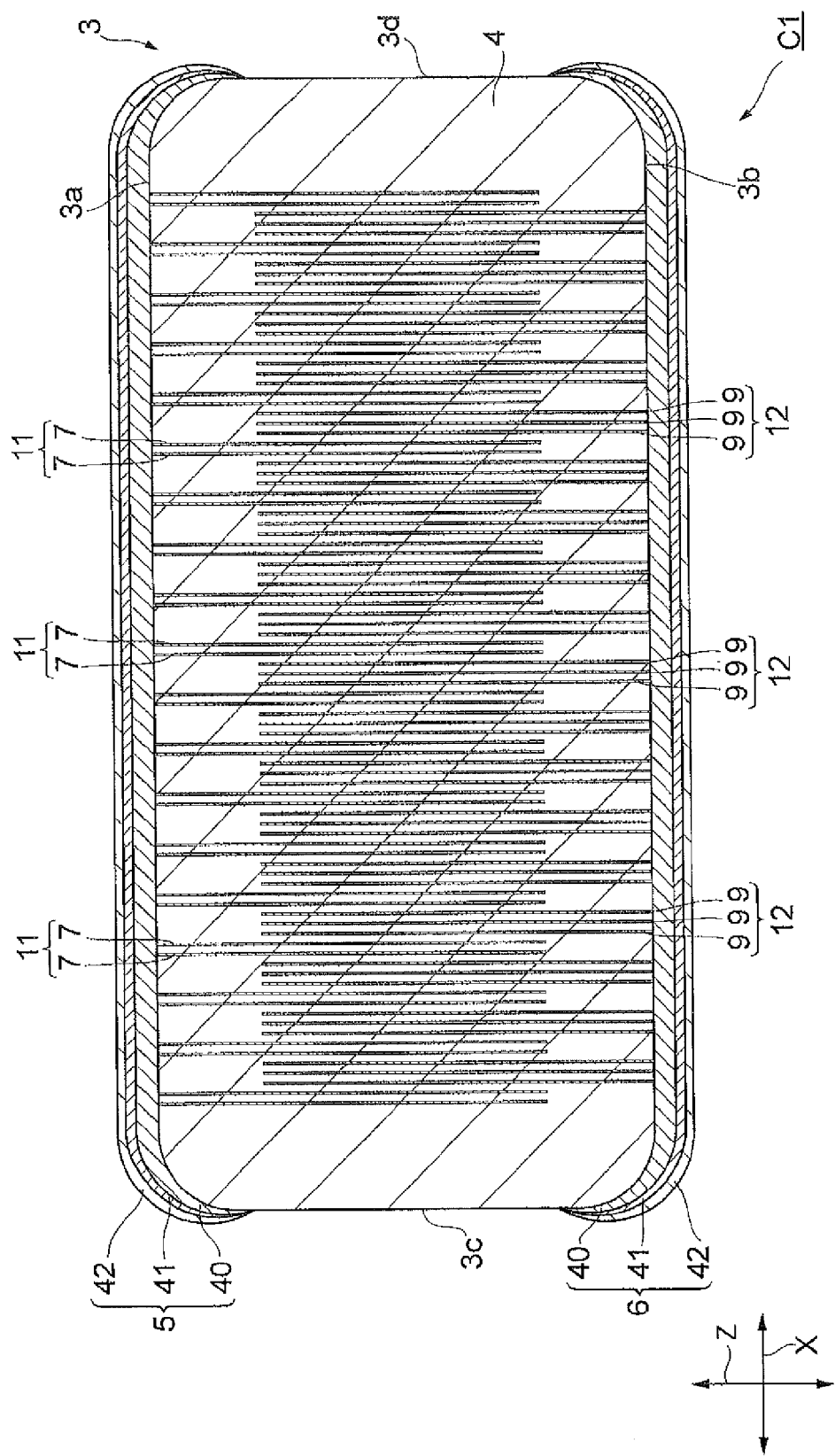
FIG. 2 is a cross-sectional view taken along a line illustrated in FIG. 1.
Figure 3:
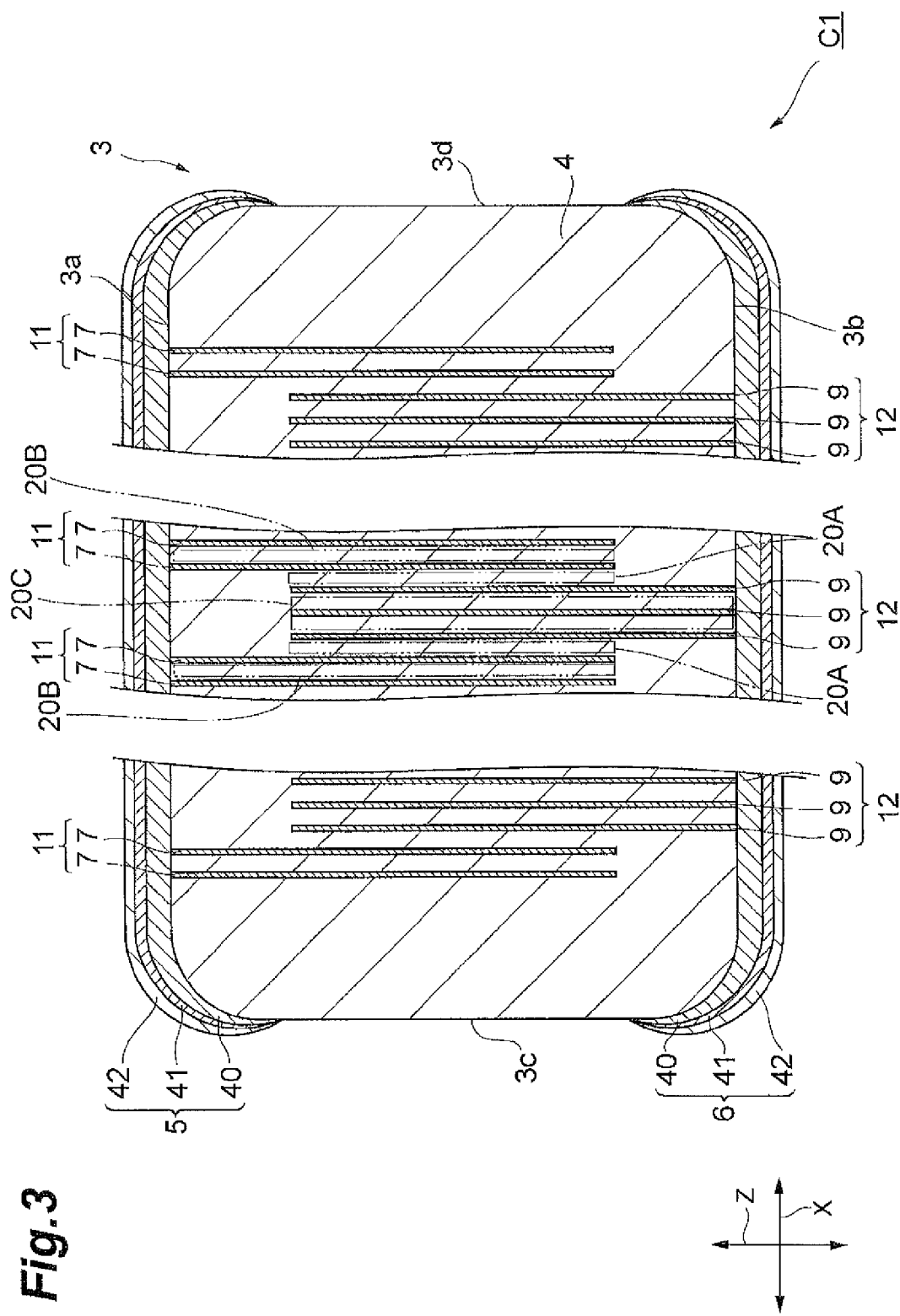
FIG. 3 is a cross-sectional view taken along the line illustrated in FIG. 1.
Figure 4:
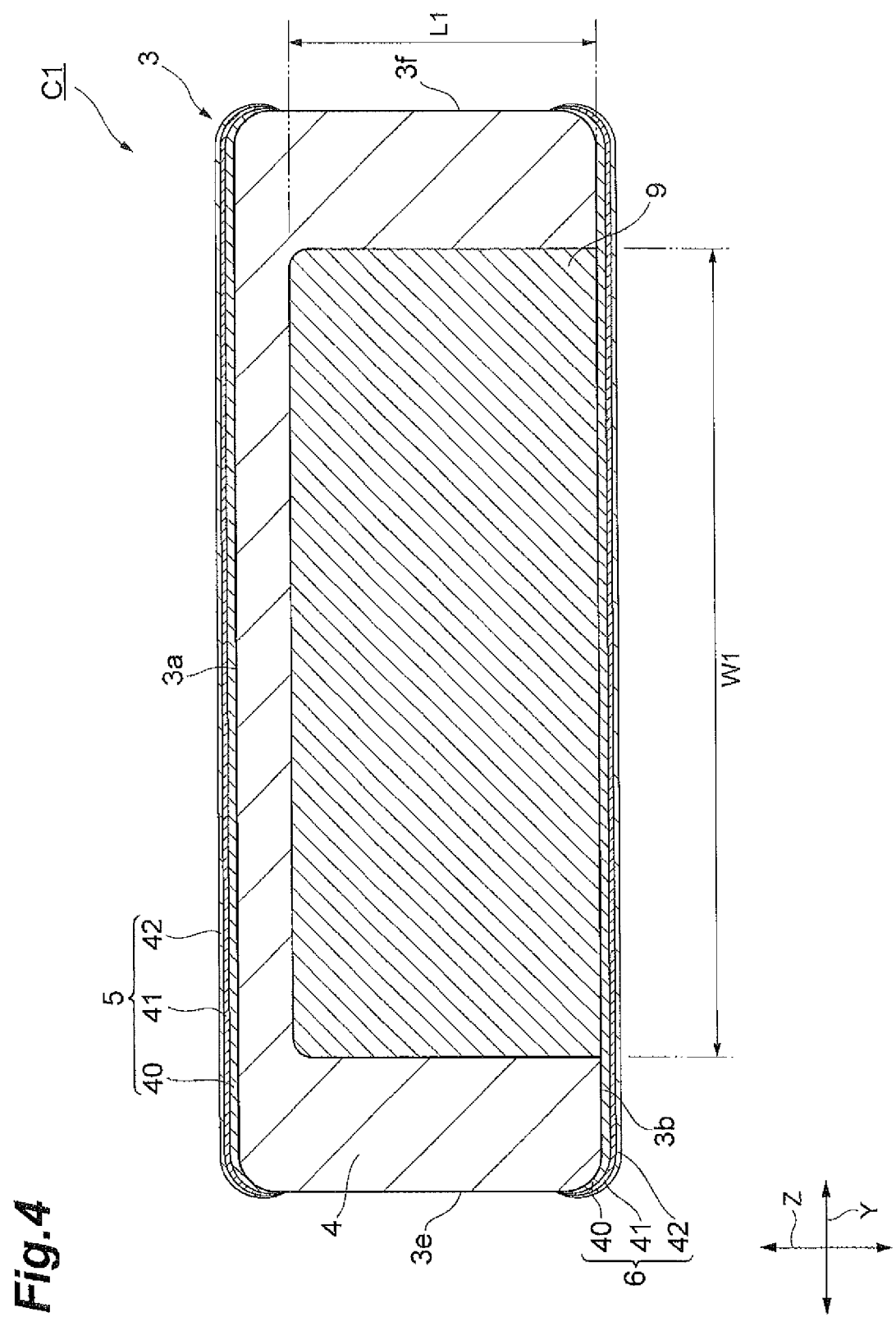
FIG. 4 is a cross-sectional view including an internal electrode of the multilayer ceramic capacitor according to the first embodiment.
Figure 5:
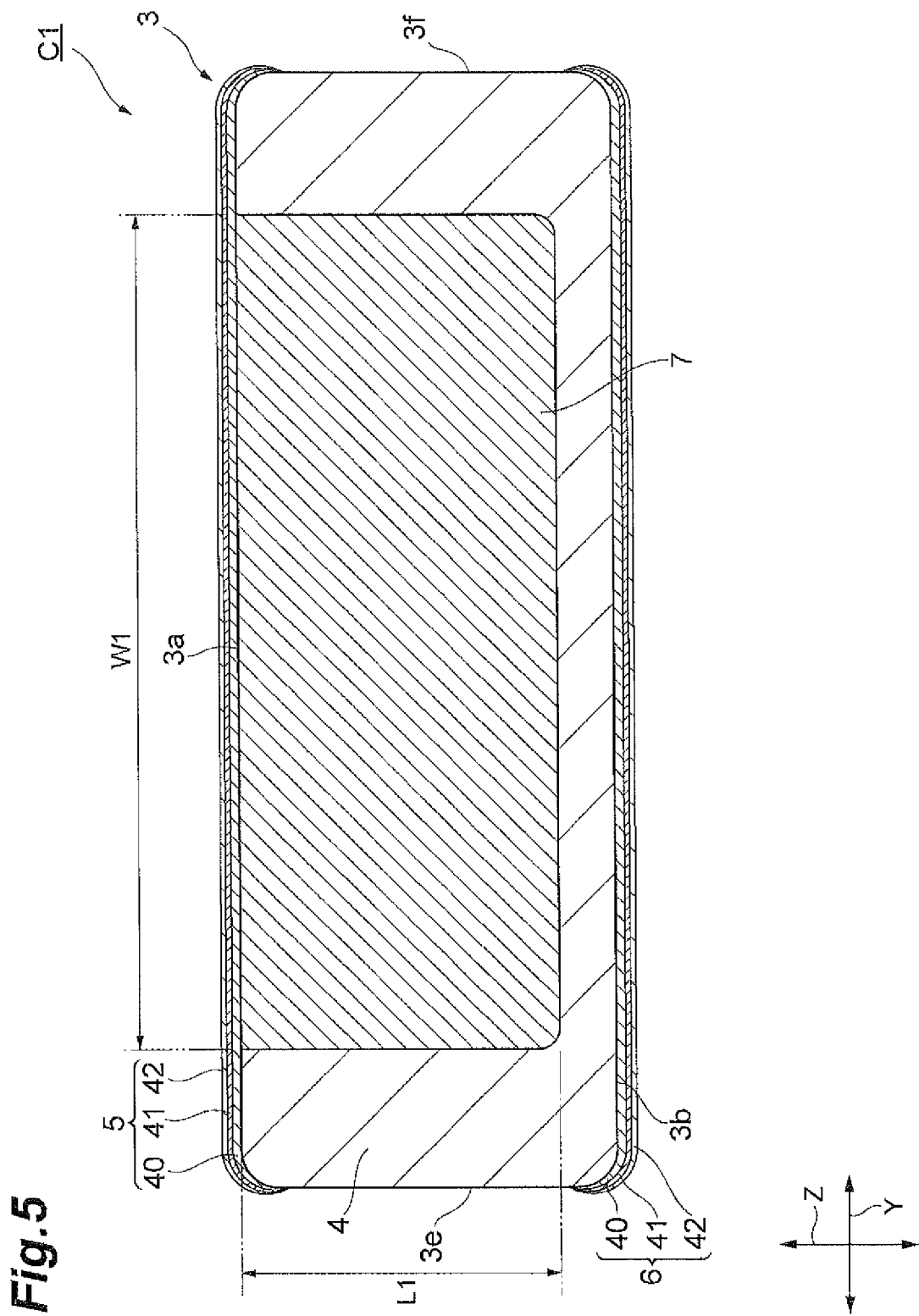
FIG. 5 is a cross-sectional view including an internal electrode of the multilayer ceramic capacitor according to the first embodiment.

First, a configuration of a multilayer ceramic capacitor according to a first embodiment will be described with reference to FIGS. 1 to 5. FIG. 1 is a perspective view illustrating the multilayer ceramic capacitor according to the first embodiment. FIGS. 2 and 3 are cross-sectional views taken along a line II-II illustrated in FIG. 1. FIGS. 4 and 5 are cross-sectional views including an internal electrode of the multilayer ceramic capacitor according to the first embodiment. In the drawings, for description of the configuration, XYZ directions are described as necessary.

As illustrated in FIGS. 1 to 5, a multilayer ceramic capacitor C1 includes an element body 3, terminal electrodes 5 and 6, and a plurality of internal electrode groups 11 and 12.

The element body 3 has a substantially rectangular parallelepiped shape. In the element body 3, a length T in an X direction is longer than a length L in a Z direction, and the length T in the X direction is smaller than or equal to a length W in a Y direction.

The element body 3 has a first main surface $3a$, a second main surface $3b$, a first side surface $3c$, a second side surface $3d$, a third side surface $3e$, and a fourth side surface $3f$ as its outer surfaces. The first main surface $3a$ and the second main surface $3b$ extend in the X direction and the Y direction and are opposed to each other. The first side surface $3c$ and the second side surface $3d$ extend in the Y direction and the Z direction and are opposed to each other. The third side surface $3e$ and the fourth side surface $3f$ extend in the X direction and the Z direction and are opposed to each other. The first side surface $3c$, the second side surface $3d$, the third side surface $3e$, and the fourth side surface $3f$ extend to connect the first main surface $3a$ and the second main surface $3b$. The X direction is a direction in which the first side surface $3c$ faces the second side surface $3d$.

The element body 3 includes a dielectric 4. The dielectric 4 is constituted by stacking a plurality of dielectric layers in the X direction. In the element body 3, a stacking direction of the plurality of dielectric layers coincides with the X direction. Each dielectric layer includes a sintered body of a ceramic green sheet including a dielectric (for example, a $BaTiO_3$—, $Ba(Ti, Zr)O_3$—, or $(Ba, Ca)TiO_3$-based dielectric ceramic). In the actual element body 3, the dielectric layers are integrated to an extent that boundaries between the dielectric layers are invisible.

The terminal electrode 5 is arranged on the first main surface $3a$. The terminal electrode 5 covers the first main surface $3a$, an edge portion of the first side surface $3c$, an edge portion of the second side surface $3d$, an edge portion of the third side surface $3e$, and an edge of the fourth side surface $3f$. That is, the terminal electrode 5 includes an electrode portion located on the first main surface $3a$, and an electrode portion located on a portion of each of the first side surface $3c$, the second side surface $3d$, the third side surface $3e$, and the fourth side surface $3f$.

The terminal electrode 6 is arranged on the second main surface $3b$. The terminal electrode 6 covers the second main surface $3b$, an edge of the first side surface $3c$, an edge of the second side surface $3d$, an edge of the third side surface $3e$, and an edge of the fourth side surface $3f$. That is, the terminal electrode 6 includes an electrode portion located on the second main surface $3b$, and an electrode portion located on a portion of each of the first side surface $3c$, the second side surface $3d$, the third side surface $3e$, and the fourth side surface $3f$.

Each of the terminal electrodes 5 and 6 includes a sintered layer 40, and plated layers 41 and 42. The sintered layers 40 are made, for example, by applying a conductive paste including a conductive metal powder and a glass frit to an outer surface of the element body 3 and sintering the conductive paste. It is preferable for the conductive metal of the printed layers to be Cu, Ni, or the like. The plated layers 41 and 42 are made on the sintered layer 40 using a plating method. It is preferable for the plated layers 41 and 42 to be Ni, Cu, Sn, Au, or the like, and it is preferable for the outermost plated layers 42 to be Au, Sn, or the like. The terminal electrodes 5 and 6 are electrically insulated from each other on the outer surface of the element body 3.

Each of the internal electrode groups 11 includes two internal electrodes 7 arranged in the X direction inside the element body 3. The two internal electrodes 7 are adjacent to each other and are opposed to each other in the X direction. One end portions of the internal electrodes 7 are exposed to the first main surface $3a$ of the element body 3. Accordingly, the internal electrodes 7 are connected to the terminal electrode 5. The other end portions of the internal electrodes 7 are located inside the element body 3, and are not exposed to the second main surface $3b$. That is, the internal electrodes 7 are not connected to the terminal electrode 6.

Each of the internal electrode groups 12 includes three internal electrodes 9 arranged in the X direction inside the element body 3. The three internal electrodes 9 are continuously arranged in the X direction so that the internal electrodes 9 adjacent to each other in the X direction are opposed to each other. One end portions of the internal electrodes 9 are exposed to the second main surface $3b$ of the element body 3. The internal electrodes 9 are connected to the terminal electrode 6. The other end portions of the internal electrodes 9 are located inside the element body 3, and are not exposed to the first main surface $3a$. The internal electrodes 9 are not connected to the terminal electrode 5.

The internal electrodes 7 and 9 have, for example, substantially rectangular shapes in a plan view. The internal electrodes 7 and 9 have a length W1 in the Y direction greater than a length L1 in the Z direction (see FIGS. 4 and 5). The internal electrodes 7 and 9 are made of a conductive material (for example, Ni or Cu) that is normally used for an internal electrode of a multilayer electric device. The internal electrodes 7 and 9 include sintered bodies of a conductive paste including the conductive material.

The internal electrode groups 11 and the internal electrode groups 12 are arranged alternately in the X direction. One of the two internal electrodes 7 included in each internal electrode group 11 and one of the three internal electrodes 9 included in each internal electrode group 12 are opposed to each other in the X direction. Since the internal electrodes 7 and the internal electrodes 9 are connected to the terminal electrodes having different polarities, the internal electrodes 7 and the internal electrodes 9 have different polarities. Accordingly, capacitance is caused between the internal electrodes 7 and the internal electrodes 9 opposed to each other in the X direction. That is, different polarity opposed regions 20A causing capacitance are located between the internal electrodes 7 and the internal electrodes 9 adjacent to each other and opposed to each other in the X direction (see FIG. 3).

Since the two internal electrodes 7 included in each internal electrode group 11 are both connected to the terminal electrode 5, the two internal electrodes 7 have the same polarity. Accordingly, capacitance is not caused between the two internal electrodes 7 opposed to each other included in the internal electrode group 11. That is, same polarity opposed region 20B causing no capacitance is located between the two internal electrodes 7 adjacent to each other and opposed to each other in the X direction (see FIG. 3).

Since the three internal electrodes 9 included in each internal electrode group 12 are all connected to the terminal electrode 6, the three internal electrodes 9 have the same polarity. Accordingly, capacitance is not caused between the two internal electrodes 9 located at both ends in the X direction among the three internal electrodes 9 included in each internal electrode group 12. That is, a same polarity opposed region 20C causing no capacitance is located between the two internal electrodes 9 opposed to each other with another of the internal electrodes 9 interposed therebetween (see FIG. 3).

An interval in the X direction between the internal electrodes 7 included in each internal electrode group 11, intervals in the X direction between the internal electrodes 9 included in each internal electrode group 12, and intervals in the X direction between the internal electrodes 7 included in the internal electrode groups 11 and the internal electrodes 9 included in the electrode groups 12 are all the same. That is, all of the internal electrodes 7 and 9 located inside the element body 3 are arranged at the same intervals in the X direction. Here, the same interval may not be exactly the same but may include values with a small difference, a manufacturing error, or the like within a preset range. For example, the interval between the adjacent internal electrodes 7 and 9 is regarded as the same interval as long as the interval between the internal electrodes 7 and 9 is in the range of ±10% from an average value of the interval.

The same polarity opposed regions 20B and the same polarity opposed regions 20C are alternately arranged in the X direction with the different polarity opposed regions 20A interposed therebetween. The same polarity opposed regions 20B, the same polarity opposed regions 20C, and the different polarity opposed regions 20A are distributed uniformly in the element body 3.

A width in the X direction of the polarity opposed regions 20B located between the pairs of internal electrodes 7 adjacent to each other in the X direction differs from a width in the X direction of the same polarity opposed regions 20C located between the internal electrodes 9 opposed to each other with another of the internal electrodes 9 interposed therebetween. A width in the X direction of the same polarity opposed regions 20B is equal to the width in the X direction of the different polarity opposed regions 20A interposed between the internal electrodes 7 and the internal electrodes 9 opposed to each other. A width in the X direction of the same polarity opposed regions 20C is greater than the width in the X direction of the different polarity opposed regions 20A.

The multilayer ceramic capacitor C1 is mounted on an electronic device (for example, a circuit board or an electronic part) that is not shown. In the multilayer ceramic capacitor C1, the first main surface 3a or the second main surface 3b of the element body 3 serves as a mounting surface for the electronic device. The multilayer ceramic capacitor C1 is mounted using a wire bonding scheme. Specifically, the terminal electrode 6 arranged on the second main surface 3b is connected to the electronic device by a conductive adhesive or a Au/Sn solder in a state in which the second main surface 3b faces the electronic device, and the terminal electrode 5 arranged on the first main surface 3a is connected to the electronic device by a wire. Further, the terminal electrode 5 arranged on the first main surface 3a may be connected to the electronic device by a conductive adhesive or a Au/Sn solder in a state in which the first main surface 3a faces the electronic device, and the terminal electrode 6 arranged on the second main surface 3b may be connected to the electronic device by a wire.

Thus, according to the multilayer ceramic capacitor C1 of this embodiment, since the length T in the X direction of the element body 3 is greater than the length L in the Z direction of the element body 3 and is smaller than or equal to the length W in the Y direction of the element body 3, the element body 3 has a low profile. The terminal electrode 5 is arranged on the first main surface 3a of the element body 3, and the terminal electrode 6 is arranged on the second main surface 3b of the element body 3. Accordingly, the first main surface 3a or the second main surface 3b constitutes a mounting surface for another electronic device. When the element body 3 is configured by stacking a plurality of dielectric layers in the X direction parallel to the first main surface 3a or the second main surface 3b, the multilayer ceramic capacitor C1 in which the element body 3 has a low profile is realized even when the number of layers increases.

One of the two internal electrodes 7 included in each internal electrode group 11 and one of the three internal electrodes 9 included in each internal electrode group 12 are opposed to each other in the X direction between the internal electrode groups 11 and the internal electrode groups 12 alternately arranged in the X direction. Capacitance is caused between the internal electrodes 7 and the internal electrodes 9 opposed to each other in the X direction.

The two internal electrodes 7 included in each internal electrode group 11 both have the same polarity. In each internal electrode group 11, capacitance is not caused between the internal electrodes 7 located at both ends in the X direction among the two internal electrodes 7.

The three internal electrodes 9 included in each of the second internal electrode groups 12 all have the same polarity. In each internal electrode group 12, capacitance is not caused between the internal electrodes 9 located at both ends in the X direction among the three internal electrodes 9.

The multilayer ceramic capacitor C1 includes an arrangement region in which a plurality of internal electrodes are arranged, and a non-arrangement region in which no internal electrodes are arranged. The arrangement region includes the plurality of different polarity opposed regions 20A causing the capacitance, and the plurality of same polarity opposed regions 20B and 20C causing no capacitance. Desired capacitance can be ensured by the plurality of different polarity opposed regions 20A causing the capacitance. The plurality of same polarity opposed regions 20B and 20C causing no capacitance are included in the arrangement region. Therefore, the multilayer ceramic capacitor C1, for example, has a greater length in the X direction of the arrangement region and a smaller length in the X direction of the non-arrangement region than a multilayer ceramic capacitor in which the internal electrodes having different polarities are alternately arranged and that has the element body of the same size as and the same capacitance as the multilayer ceramic capacitor C1.

In the arrangement region, all the internal electrodes 7 and 9 are arranged at the same intervals in the X direction. Therefore, in the arrangement region, it is difficult for cracks caused by a difference in thermal shrinkage to occur. In the multilayer ceramic capacitor C1, the arrangement region is large, that is, a region in which it is difficult for the cracks caused by the difference in thermal shrinkage to occur is wider than in the above-mentioned comparison capacitor. Therefore, it is possible to suppress the occurrence of cracks caused by the difference in thermal shrinkage in the entire element body 3. The number (2) of internal electrodes 7 included in the internal electrode groups 11 and the number (3) of internal electrodes 9 included in the internal electrode groups 12 are different integers equal to or greater than 2. Accordingly, a width in the X direction of the same polarity opposed regions 20B between the internal electrodes 7 and a width in the X direction of the same polarity opposed regions 20C between the internal electrodes 9 located at both ends in the X direction between the internal electrodes 9 are equal to or larger than at least a width in the X direction of a region in which the capacitance is caused between the internal electrodes 7 and the internal electrodes 9 opposed to each other. The width in the X direction of the same polarity opposed regions 20B differs from the width in the X direction of the same polarity opposed regions 20C.

Since the same polarity opposed regions 20B and 20C have different widths, a non-arrangement region in the element body 3 can be narrowed as much as possible. Accordingly, it is possible to further increase the width in the X direction of the arrangement region than in the element body of the above-mentioned comparison capacitor without changing desired capacitance. That is, it is possible to further increase a percentage of a region in which it is difficult for cracks caused by the difference in thermal shrinkage to occur, in the entire element body, as compared to the above-mentioned comparison capacitor. Accordingly, it possible to further suppress the occurrence of cracks caused by the difference in thermal shrinkage.

Thus, it is possible to suppress the occurrence of cracks while ensuring desired capacitance.

According to the multilayer ceramic capacitor C1 of this embodiment, it is possible to suppress internal stress generated in the element body 3 due to the difference in thermal shrinkage. As a result, even when tensile stress is applied to the multilayer ceramic capacitor C1 (element body 3) when solder is solidified at the time of mounting the multilayer ceramic capacitor C1, it is possible to suppress the occurrence of cracks caused by the internal stress.

According to this embodiment, since the internal electrode groups 11 and the internal electrode groups 12 are arranged alternately in the X direction, the sets of two internal electrodes 7 and the sets of three internal electrodes 9 are located to be uniformly distributed in the entire element body 3. Therefore, it is possible to uniformly fire the element body 3, and further suppress the occurrence of cracks caused by the difference in thermal shrinkage.

According to this embodiment, since the number of internal electrodes 7 included in the internal electrode groups 11 and the number of internal electrodes 9 included in the internal electrode groups 12 are different from each other, the number of internal electrodes 7 exposed to the first main surface 3a to be connected to one terminal electrode 5 and the number of internal electrodes 9 exposed to the second main surface 3b to be connected to the other terminal electrode 6 are different from each other. Accordingly, it is possible to identify the first and second main surfaces 3a and 3b.

Second Embodiment

Figure 6:
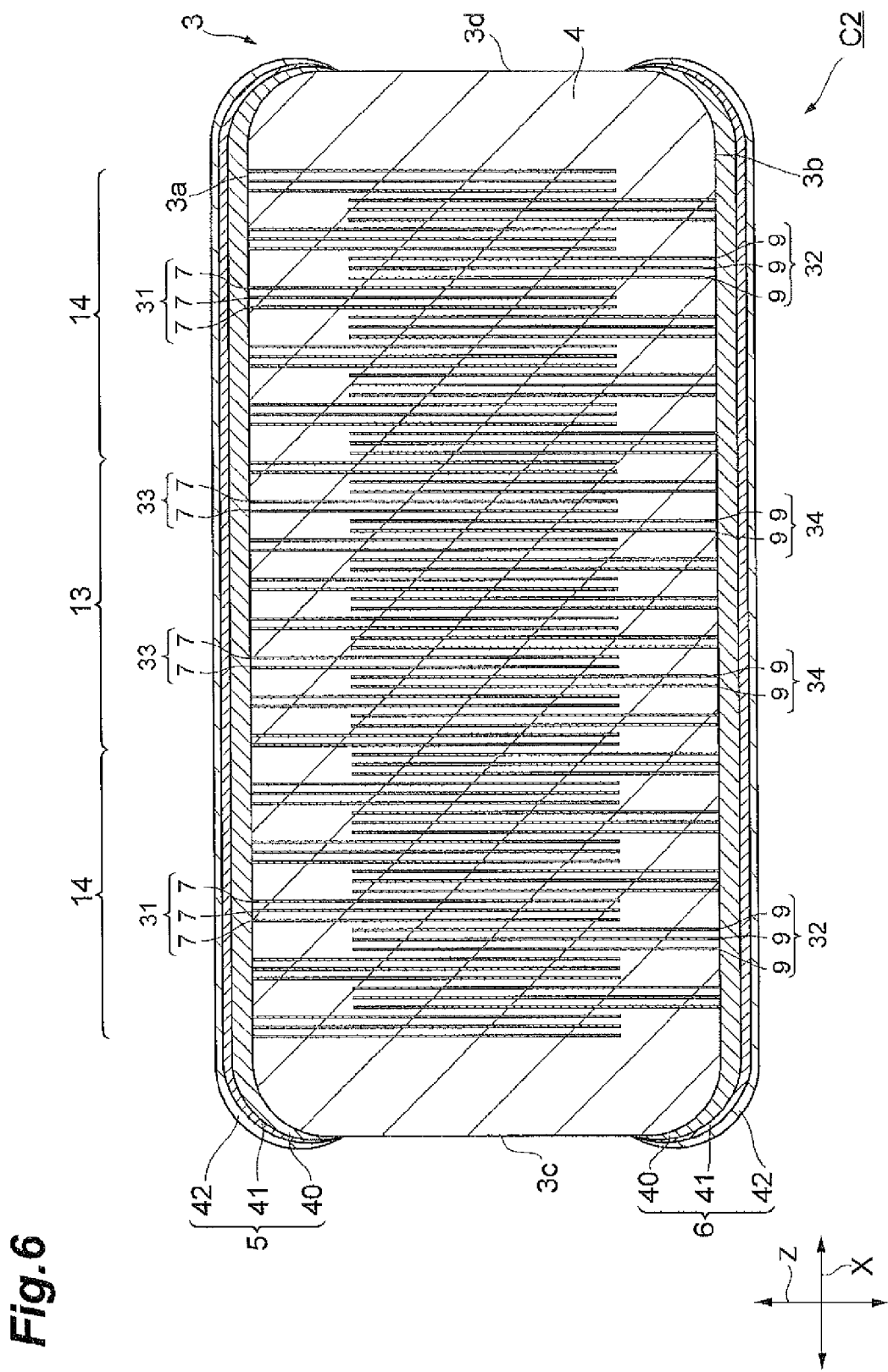
FIG. 6 is a cross-sectional view illustrating a multilayer ceramic capacitor according to a second embodiment.
Figure 7:
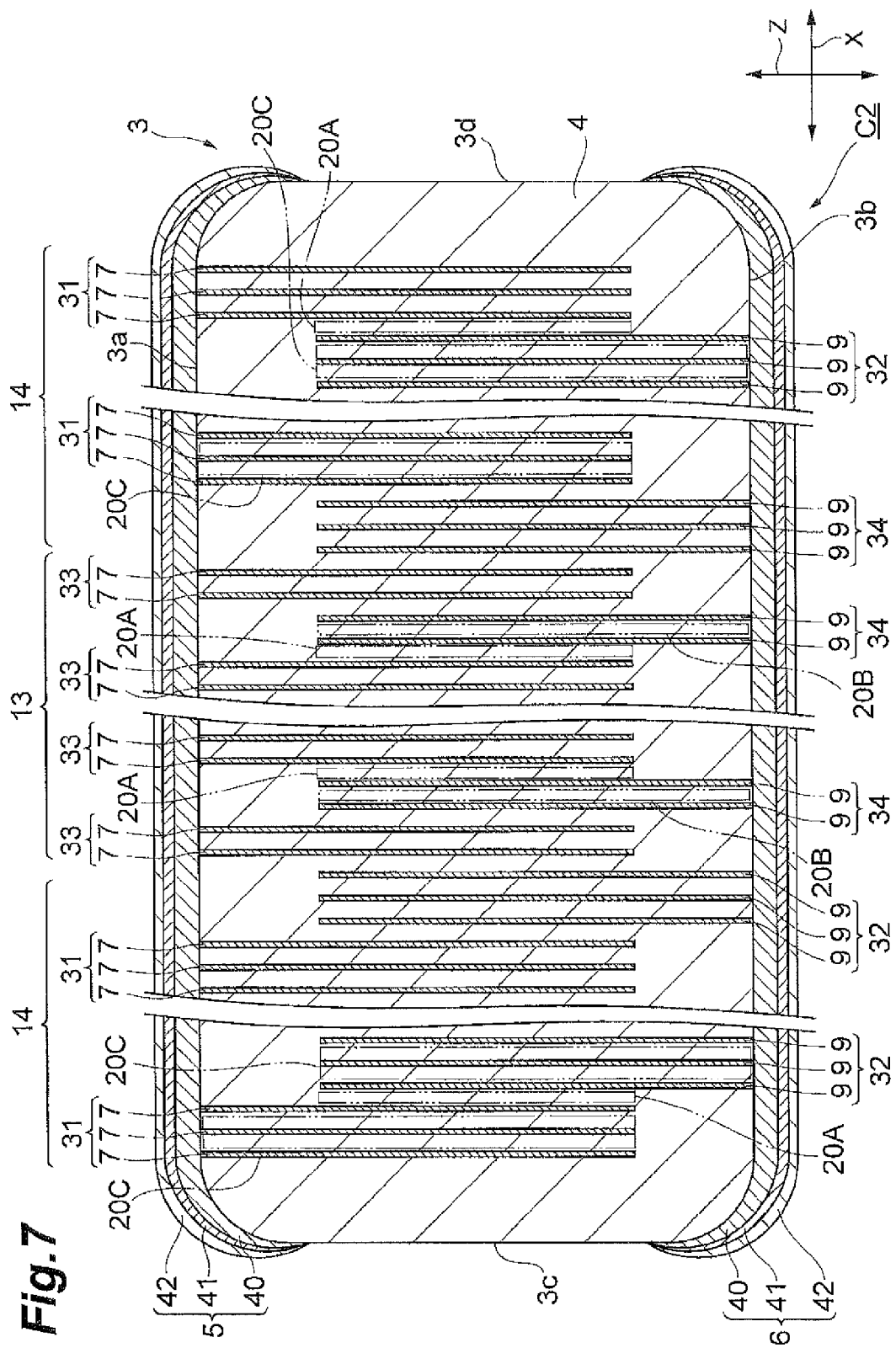
FIG. 7 is a cross-sectional view illustrating a multilayer ceramic capacitor according to the second embodiment.

Next, a configuration of a multilayer ceramic capacitor according to a second embodiment will be described with reference to FIGS. 6 and 7. FIGS. 6 and 7 are XZ cross-sectional views illustrating the multilayer ceramic capacitor according to the second embodiment. FIG. 6 corresponds to FIG. 1 in the first embodiment, and FIG. 7 corresponds to FIG. 2 in the first embodiment.

As illustrated in FIGS. 6 and 7, a multilayer ceramic capacitor C2 according to this embodiment includes an element body 3, and terminal electrodes 5 and 6, similarly to the multilayer ceramic capacitor C1 according to the above-described embodiment.

A difference between the multilayer ceramic capacitor C2 according to this embodiment and the multilayer ceramic capacitor C1 according to the first embodiment is that an element body 3, an inner portion 13, and a pair of outer portions 14 located with the inner portion 13 interposed therebetween in the first direction are included, and a plurality of internal electrode groups 31, 32, 33, and 34 are included in place of the plurality of internal electrode groups 11 and 12. The plurality of internal electrode groups 31 and 32 are located in the outer portions 14 of the element body 3, and the plurality of internal electrode groups 33 and 34 are located in the inner portion of the element body 3.

The internal electrode groups 31 each include three internal electrodes 7 arranged in the X direction inside the element body 3. The three internal electrodes 7 are continuously arranged in the X direction so that the internal electrodes 7 adjacent to each other in the X direction are opposed to each other.

The internal electrode groups 32 each include three internal electrodes 9 arranged in the X direction inside the element body 3. The three internal electrodes 9 are continuously arranged in the X direction so that the internal electrodes 9 adjacent to each other in the X direction are opposed to each other.

The internal electrode groups 33 each include two internal electrodes 7 arranged in the X direction inside the element body 3. The two internal electrodes 7 are adjacent to each other and are opposed to each other in the X direction.

The internal electrode groups 34 each include two internal electrodes 9 arranged in the X direction inside the element body 3. The two internal electrodes 9 are adjacent to each other and are opposed to each other in the X direction.

One end portions of the internal electrodes 7 included in the internal electrode groups 31 and 33 are exposed to a first main surface 3a of the element body 3. Accordingly, the internal electrodes 7 are connected to the terminal electrode 5. The other end portions of the internal electrodes 7 are located inside the element body 3, and are not exposed to the second main surface 3b. That is, the internal electrodes 7 are not connected to the terminal electrode 6.

One end portions of the internal electrodes 9 included in the internal electrode groups 32 and 34 are exposed to a second main surface 3b of the element body 3. Accordingly, the internal electrodes 9 are connected to the terminal electrode 6. The other end portions of the internal electrodes 9 are located inside the element body 3, and are not exposed to the first main surface 3a. That is, the internal electrodes 9 are not connected to the terminal electrode 5.

The internal electrodes 7 and 9 have, for example, substantially rectangular shapes in a plan view, as in the first embodiment. The internal electrodes 7 and 9 have a length W1 in the Y direction greater than a length L1 in the Z direction (see FIG. 3). The internal electrodes 7 and 9 are made of a conductive material (for example, Ni or Cu) that is normally used for an internal electrode of a multilayer electric device. The internal electrodes 7 and 9 include sintered bodies of a conductive paste including the conductive material.

The internal electrode groups 31 and the internal electrode groups 32 are arranged alternately in the X direction. One of the three internal electrodes 7 in each internal electrode group 31 and one of the three internal electrodes 9 in each internal electrode group 32 are opposed to each other in the X direction. Since the internal electrodes 7 and the internal electrodes 9 are connected to the terminal electrodes having different polarities, the internal electrodes 7 and the internal electrodes 9 have different polarities. Different polarity opposed regions 20A causing capacitance are located between the internal electrodes 7 and the internal electrodes 9 adjacent to each other and opposed to each other in the X direction.

Since the three internal electrodes 7 in each internal electrode group 31 are all connected to the terminal electrode 5, the three internal electrodes 7 have the same polarity. Accordingly, capacitance is not caused between the internal electrodes 7 located at both ends in the X direction among the three internal electrodes 7 in each internal electrode group 31. The same polarity opposed region 20C causing no capacitance is located between the internal electrodes 7 opposed to each other with another internal electrode 7 interposed therebetween. The same polarity opposed regions 20C are located in the outer portions 14 of the element body 3.

Since the three internal electrodes 9 in each internal electrode group 32 are all connected to the terminal electrode 6, the three internal electrodes 9 have the same polarity. Accordingly, capacitance is not caused between the internal electrodes 9 located at both ends in the X direction among the three internal electrodes in each internal electrode group 32. The same polarity opposed regions 20C causing no capacitance are located between the internal electrodes 9 opposed to each other with another internal electrode 9 interposed therebetween. The same polarity opposed regions 20C are located in the outer portions 14 of the element body 3.

The internal electrode groups 33 and the internal electrode groups 34 are arranged alternately in the X direction. One of the two internal electrodes 7 in each internal electrode group 33 and one of the two internal electrodes 9 in each internal electrode group 34 are opposed to each other in the X direction. Since the internal electrodes 7 and the internal electrodes 9 are connected to the terminal electrodes having different polarities, the internal electrodes 7 and the internal electrodes 9 have different polarities. Different polarity opposed regions 20A causing capacitance are located between the internal electrodes 7 and the internal electrodes 9 adjacent to each other and opposed to each other in the X direction.

Since the two internal electrodes 7 included in each internal electrode group 31 are both connected to the terminal electrode 5, the two internal electrodes 7 have the same polarity. Accordingly, capacitance is not caused between the two opposed internal electrodes 7 included in each internal electrode group 33. The same polarity opposed regions 20B causing no capacitance are located between the internal electrodes 7 adjacent to each other and opposed to each other in the X direction. The same polarity opposed regions 20B are located in the inner portion 13 of the element body 3.

Since the two internal electrodes 9 included in each internal electrode group 34 are both connected to the terminal electrode 6, the two internal electrodes 9 have the same polarity. Accordingly, capacitance is not caused between the two opposed internal electrodes 9 included in each internal electrode group 34. The same polarity opposed regions 20B causing no capacitance are located between the internal electrodes 9 adjacent to each other and opposed to each other in the X direction. The same polarity opposed regions 20B are located in the inner portion 13 of the element body 3.

Intervals in the X direction between the internal electrodes 7 included in the internal electrode groups 31, intervals in the X direction between the internal electrodes 9 included in the internal electrode groups 32, intervals in the X direction between the internal electrodes 7 included in the internal electrode groups 31 and the internal electrodes 9 included in the electrode groups 32, intervals in the X direction between the internal electrodes 7 included in the internal electrode groups 33, intervals in the X direction between the internal electrodes 9 included in the internal electrode groups 34, and intervals in the X direction between the internal electrodes 7 included in the internal electrode groups 33 and the internal electrodes 9 included in the internal electrode groups 34 are all the same. That is, all of the internal electrodes 7 and 9 located in the outer portions 14 and the inner portion 13 of the element body 3 are arranged at the same intervals in the X direction.

The internal electrodes 7 and 9 located on both sides of the boundaries between the outer portions 14 and the inner portion 13 of the element body 3 are also arranged at the same intervals as the intervals at which the internal electrodes 7 and 9 located in the outer portions 14 and the inner portion 13 of the element body 3 are arranged in the X direction. That is, intervals in the X direction between the internal electrodes 9 included in the internal electrode groups 32 and the internal electrodes 7 included in the internal electrode groups 33 are the same as the intervals at which the internal electrodes 7 and 9 located in the outer portions 14 and the inner portion 13 of the element body 3 are arranged in the X direction. That is, all of the internal electrodes 7 and 9 located inside the element body 3 are arranged at the same intervals in the X direction.

The same polarity opposed regions 20B and the same polarity opposed regions 20C are alternately arranged in the X direction with the different polarity opposed regions 20A interposed therebetween. The same polarity opposed regions 20B, the same polarity opposed regions 20C, and the different polarity opposed regions 20A are distributed uniformly inside the element body 3.

A width in the X direction of the same polarity opposed regions 20B between the pairs of internal electrodes 7 adjacent to each other in the X direction and a width in the X direction of the same polarity opposed region 20C between the internal electrodes 9 opposed to each other with another internal electrode 9 interposed therebetween are different from each other. The width in the X direction of the same polarity opposed regions 20B is equal to the width in the X direction of the different polarity opposed regions 20A interposed between the internal electrodes 7 and the internal electrodes 9 opposed to each other. A width in the X direction of the same polarity opposed regions 20C is greater than the width in the X direction of the different polarity opposed regions 20A.

Thus, in the multilayer ceramic capacitor C2 according to this embodiment, one of the three internal electrodes 7 included in each internal electrode group 31 and one of the three internal electrodes 9 included in each internal electrode group 32 are opposed to each other in the X direction between internal electrode groups 31 and the internal electrode groups 32 alternately arranged in the X direction. Capacitance is caused between the internal electrodes 7 and the internal electrodes 9 opposed to each other in the X direction.

The three internal electrodes 7 included in each internal electrode group 31 all have the same polarity. In each internal electrode group 31, capacitance is not caused between the internal electrodes 7 located at both ends in the X direction among the three internal electrodes 7. The three internal electrodes 9 included in each internal electrode group 32 all have the same polarity. In each internal electrode group 32, capacitance is not caused between the internal electrodes 9 located at both ends in the X direction of the three internal electrodes 9.

One of the two internal electrodes 7 included in each internal electrode group 33 and one of the two internal electrodes 9 included in each internal electrode group 34 are opposed to each other in the X direction between the internal electrode groups 33 and the internal electrode groups 34 alternately arranged in the X direction. Capacitance is caused between the internal electrodes 7 and the internal electrodes 9 opposed to each other in the X direction.

The two internal electrodes 7 included in each internal electrode group 33 both have the same polarity. In each internal electrode group 33, capacitance is not caused between the two internal electrodes 7 adjacent to each other in the X direction. The two internal electrodes 9 included in each internal electrode group 34 both have the same polarity. In each internal electrode group 34, capacitance is not caused between the two internal electrodes 9 adjacent to each other in the X direction.

The multilayer ceramic capacitor C2 includes an arrangement region in which the plurality of internal electrodes 7 and 9 are arranged, and a non-arrangement region in which the plurality of internal electrodes 7 and 9 are not arranged. The arrangement region includes a plurality of different polarity opposed regions 20A causing the capacitance, and a plurality of same polarity opposed regions 20B causing no capacitance. Desired capacitance can be ensured by the plurality of different polarity opposed regions 20A causing the capacitance. The plurality of same polarity opposed regions 20B and 20C causing no capacitance are included in the arrangement region. Therefore, the multilayer ceramic capacitor C2, for example, has a greater length in the X direction of the arrangement region and a smaller length in the X direction of the non-arrangement region than a multilayer ceramic capacitor in which the internal electrodes having different polarities are alternately arranged and that has the element body of the same size as and the same capacitance as the multilayer ceramic capacitor C2.

In the arrangement region, all the internal electrodes 7 and 9 are arranged at the same intervals in the X direction. Therefore, in the arrangement region, it is difficult for cracks caused by the difference in thermal shrinkage to occur. In the multilayer ceramic capacitor C2, the arrangement region is large, that is, a region in which it is difficult for the cracks caused by the difference in thermal shrinkage to occur is wider than in the above-mentioned comparison capacitor. Therefore, it is possible to suppress the occurrence of cracks caused by the difference in thermal shrinkage in the entire element body 3. The number (3) of internal electrodes 7 and 9 included in the internal electrode groups 31 and 32 and the number (2) of internal electrodes 7 and 9 included in the internal electrode groups 33 and 34 are different integers equal to or greater than 2. Accordingly, a width in the X direction of the same polarity opposed regions 20C between the internal electrodes 7 located at both ends in the X direction among the three internal electrodes 7, a width in the X direction of the same polarity opposed regions 20C between the internal electrodes 9 located at both ends in the X direction among the three internal electrodes 9, a width in the X direction of the same polarity opposed regions 20B between the two internal electrodes 7, and a width in the X direction of the same polarity opposed regions 20B between the two internal electrodes 9 are equal to or larger than at least a width in the X direction of the different polarity opposed regions 20A between the internal electrodes 7 and the internal electrodes 9 opposed to each, and are different from each other.

Since the same polarity opposed regions 20B and 20C have different widths, a non-arrangement region in the element body 3 can be narrowed as much as possible. Accordingly, it is possible to further increase the width in the X direction of the arrangement region than in the element body of the above-mentioned comparison capacitor without changing desired capacitance. That is, it is possible to further increase a percentage of a region in which it is difficult for cracks caused by the difference in thermal shrinkage to occur, in the entire element body, as compared to the above-mentioned comparison capacitor. Accordingly, it possible to further suppress the occurrence of cracks caused by the difference in thermal shrinkage.

Thus, it is possible to suppress the occurrence of cracks while ensuring desired capacitance.

According to the multilayer ceramic capacitor C2 in this embodiment, the same polarity opposed regions 20C between the internal electrodes 7 and 9 located at both ends in the X direction among the sets of three internal electrodes 7 and 9 are located in the outer portions 14 of the element body 3. The same polarity opposed regions 20B between the pairs of internal electrodes 7 and 9 are located in the inner portion 13 of the element body 3. That is, the number of internal electrodes included in the region causing no capacitance in the outer portions 14 of the element body 3 is larger than that in the inner portion 13 of the element body 3. Therefore, even when cracks occur, for example, in the outer portions 14 of the element body 3, it is possible to prevent the cracks from reaching the internal electrodes having different polarities that contribute to the capacitance.

Third Embodiment

Figure 8:
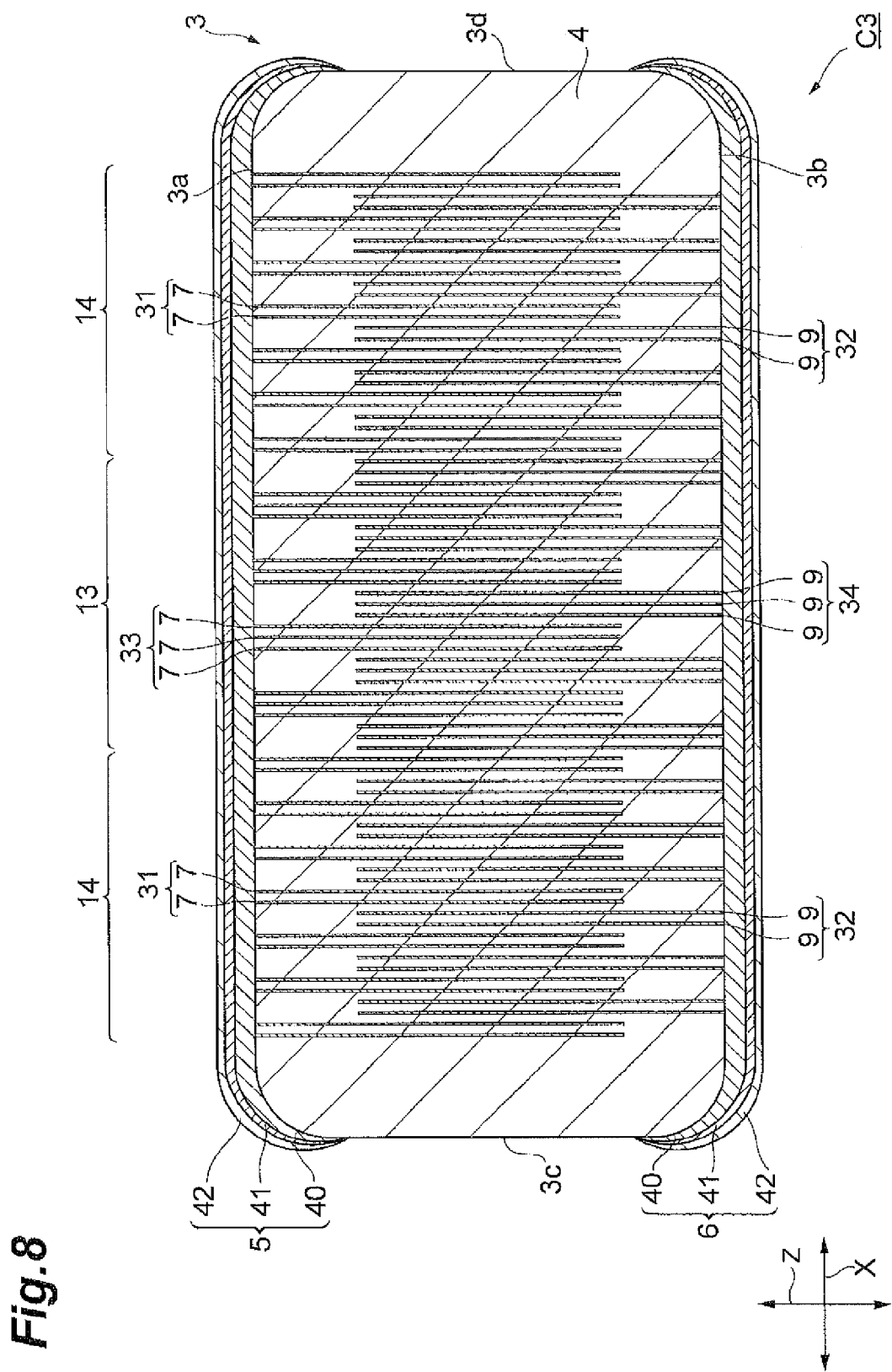
FIG. 8 is a cross-sectional view illustrating a multilayer ceramic capacitor according to a third embodiment.
Figure 9:
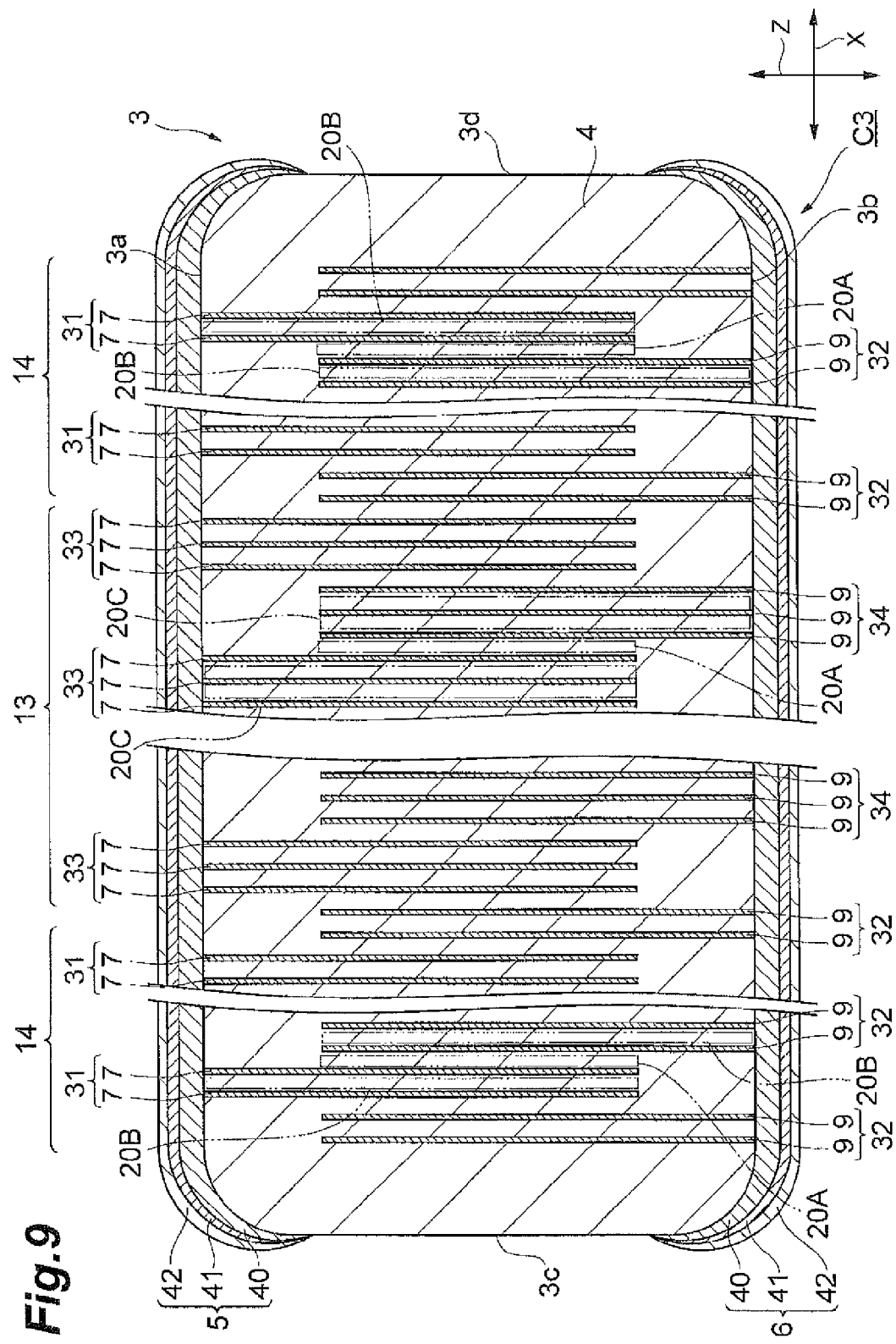
FIG. 9 is a cross-sectional view illustrating a multilayer ceramic capacitor according to the third embodiment.

Next, a configuration of a multilayer ceramic capacitor according to a third embodiment will be described with reference to FIGS. 8 and 9. FIGS. 8 and 9 are XZ cross-sectional views illustrating the multilayer ceramic capacitor according to the third embodiment. FIG. 8 corresponds to FIG. 1 in the first embodiment, and FIG. 9 corresponds to FIG. 2 in the first embodiment.

As illustrated in FIGS. 8 and 9, a multilayer ceramic capacitor C3 according to this embodiment includes an element body 3, terminal electrodes 5 and 6, and a plurality of internal electrode groups 31 and 32, 33, and 34, similarly to the multilayer ceramic capacitor C2 according to the above-described embodiment.

A difference between the multilayer ceramic capacitor C3 according to this embodiment and the multilayer ceramic capacitor C2 according to the first embodiment is that the number of internal electrodes 7 and 9 included in the internal electrode groups 33 and 34 located in the inner portion 13 of the element body 3 is larger than the number of internal electrodes 7 and 9 included in the internal electrode groups 31 and 32 located in the outer portion 14 of the element body 3.

The internal electrode groups 31 and the internal electrode groups 32 are arranged alternately in the X direction. One of the two internal electrodes 7 included in each internal electrode group 31 and one of the two internal electrodes 9 included in each internal electrode group 32 are opposed to each other in the X direction. Different polarity opposed regions 20A causing capacitance are located between the internal electrodes 7 and the internal electrodes 9 adjacent to each other and opposed to each other in the X direction.

The internal electrode groups 31 each include two internal electrodes 7 arranged in the X direction in the outer portions 14 of the element body 3. The same polarity opposed regions 20B causing no capacitance are located between the internal electrodes 7 adjacent to each other and opposed to each other in the X direction. The same polarity opposed regions 20B are located in the outer portions 14 of the element body 3.

The internal electrode groups 32 each include two internal electrodes 9 arranged in the X direction in the outer portions 14 of the element body 3. The same polarity opposed regions 20B causing no capacitance are located between the internal electrodes 9 adjacent to each other and opposed to each other in the X direction. The same polarity opposed regions 20B are located in the outer portions 14 of the element body 3.

The internal electrode groups 33 and the internal electrode groups 34 are arranged alternately in the X direction. One of the three internal electrodes 7 included in each internal electrode group 33 and one of the three internal electrodes 9 included in each internal electrode group 34 are opposed to each other in the X direction. The different polarity opposed regions 20A causing capacitance are located between the internal electrodes 7 and the internal electrodes 9 opposed to each other in the X direction.

The internal electrode groups 33 each include three internal electrodes 7 arranged in the X direction inside the element body 3. The same polarity opposed regions 20C causing no capacitance are located between the internal electrodes 7 opposed to each other with another internal electrode 7 interposed therebetween. The same polarity opposed regions 20C are located in the inner portion 13 of the element body 3.

The internal electrode groups 34 each include three internal electrodes 9 arranged in the X direction inside the element body 3. The same polarity opposed regions 20C causing no capacitance are located between the internal electrodes 9 opposed to each other with another internal electrode 9 interposed therebetween. The same polarity opposed regions 20C are located in the inner portion 13 of the element body 3.

Intervals in the X direction between the internal electrodes 7 included in the internal electrode groups 31, intervals in the X direction between the internal electrodes 9 included in the internal electrode groups 32, intervals in the X direction between the internal electrodes 7 included in the internal electrode groups 31 and the internal electrodes 9 included in the electrode groups 32, intervals in the X direction between the internal electrodes 7 included in the internal electrode groups 33, intervals in the X direction between the internal electrodes 9 included in the internal electrode groups 34, and intervals in the X direction between the internal electrodes 7 included in the internal electrode groups 33 and the internal electrodes 9 included in the internal electrode groups 34 are all the same. That is, all of the internal electrodes 7 and 9 located in the outer portions 14 and the inner portion 13 of the element body 3 are arranged at the same intervals in the X direction, similarly to the multilayer ceramic capacitor C2 according to the above-described embodiment.

The internal electrodes 7 and 9 located on both sides of the boundaries between the outer portions 14 and the inner portion 13 of the element body 3 are also arranged at the same intervals as the intervals at which the internal electrodes 7 and 9 located in the outer portions 14 and the inner portion 13 of the element body 3 are arranged in the X direction. That is, intervals in the X direction between the internal electrodes 9 included in the internal electrode groups 32 and the internal electrodes 7 included in the internal electrode groups 33 are the same as the intervals at which the internal electrodes 7 and 9 located in the outer portions 14 and the inner portion 13 of the element body 3 are arranged in the X direction. That is, all of the internal electrodes 7 and 9 located inside the element body 3 are arranged at the same intervals in the X direction.

In the multilayer ceramic capacitor C3 according to this embodiment, desired capacitance can be ensured by the plurality of different polarity opposed regions 20A causing the capacitance, similarly to the above-described embodiment. The same polarity opposed regions 20B causing no capacitance are included in the arrangement region. Therefore, the multilayer ceramic capacitor C3, for example, has a greater length in the X direction of the arrangement region and a smaller length in the X direction of the non-arrangement region than a multilayer ceramic capacitor in which the internal electrodes having different polarities are alternately arranged and that has the element body of the same size as and the same capacitance as the multilayer ceramic capacitor C3.

In the arrangement region, all the internal electrodes 7 and 9 are arranged at the same intervals in the X direction. Therefore, in the arrangement region, it is difficult for cracks caused by the difference in thermal shrinkage to occur. In the multilayer ceramic capacitor C3, the arrangement region is large, that is, a region in which it is difficult for the cracks caused by the difference in thermal shrinkage to occur is wider than in the above-mentioned comparison capacitor. Therefore, it is possible to suppress the occurrence of cracks caused by the difference in thermal shrinkage in the entire element body 3. Since the same polarity opposed regions 20B and 20C have different widths, a region of the dielectric 4 in which the internal electrodes 7 and 9 are not arranged in the element body 3 can be narrowed as much as possible. Accordingly, it is possible to further increase the width in the X direction of the arrangement region than in the element body of the above-mentioned comparison capacitor without changing desired capacitance. That is, it is possible to further increase a percentage of a region in which it is difficult for cracks caused by the difference in thermal shrinkage to occur, in the entire element body, as compared to the above-mentioned comparison capacitor. Accordingly, it possible to further suppress the occurrence of cracks caused by the difference in thermal shrinkage.

Thus, it is possible to suppress the occurrence of cracks while ensuring desired capacitance.

According to this embodiment, the same polarity opposed regions 20B between the pairs of internal electrodes 7 and 9 are located in the outer portions 14 of the element body 3, and the same polarity opposed regions 20C between the internal electrodes 7 and 9 located at both ends in the X direction among the sets of three internal electrode 7 and 9 are located in the inner portion 13 of the element body 3. That is, the number of internal electrodes included in a region causing no capacitance in the inside portion 13 of the element body 3 is larger than that in the outer portions 14 of the element body 3. Accordingly, it is possible to improve connectivity between the internal electrodes 7 and 9 and the terminal electrodes 5 and 6 in the inner portion 13 of the element body 3 that is not easily subjected to barrel polishing.

Fourth Embodiment

Figure 10:
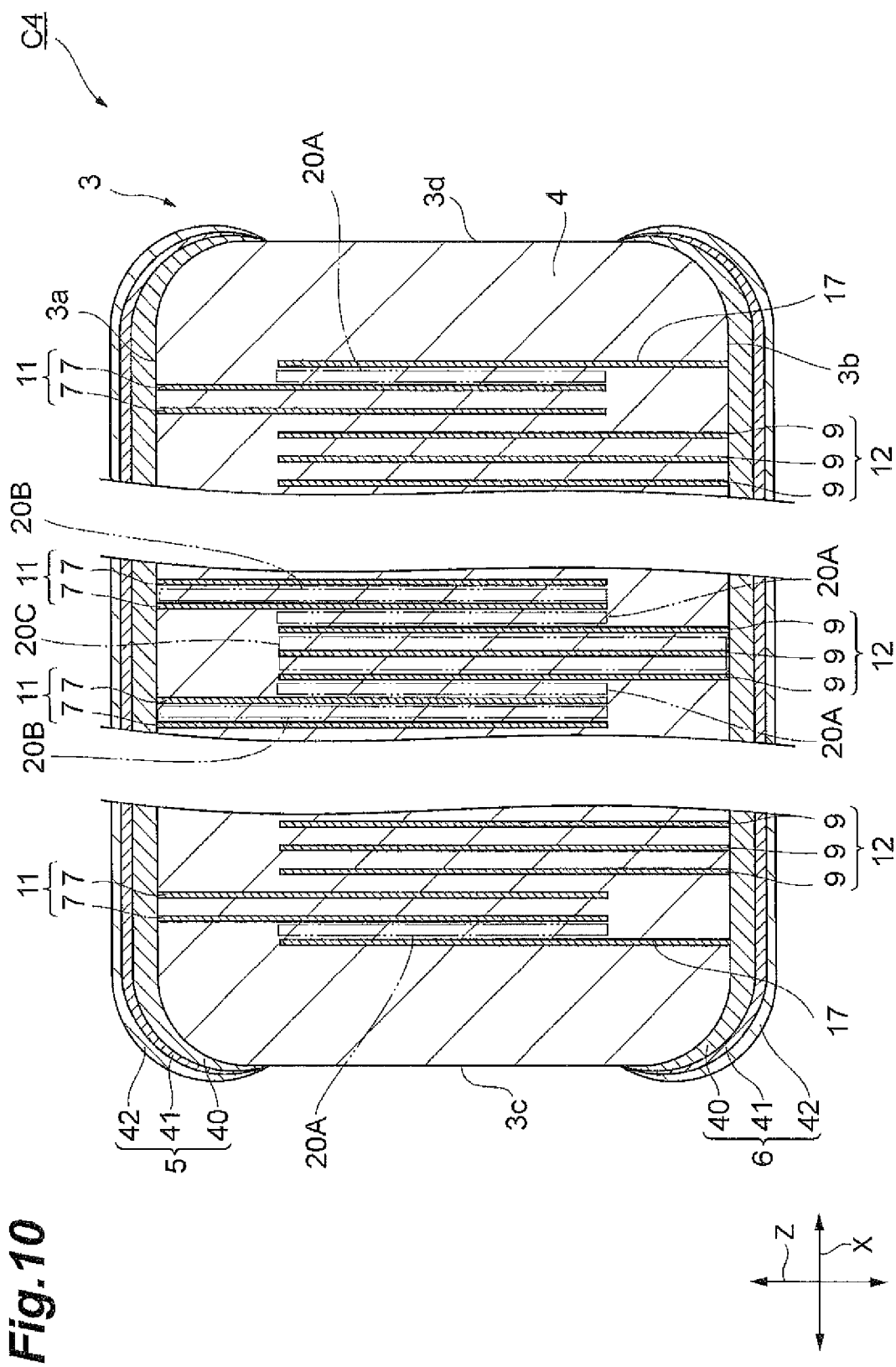
FIG. 10 is a cross-sectional view illustrating a multilayer ceramic capacitor according to a fourth embodiment.

Next, a configuration of a multilayer ceramic capacitor according to a fourth embodiment will be described with reference to FIG. 10. FIG. 10 is a cross-sectional view illustrating the multilayer ceramic capacitor according to the fourth embodiment, and is an XZ cross-sectional view corresponding to FIG. 2 in the first embodiment.

As illustrated in FIG. 10, a multilayer ceramic capacitor C4 according to this embodiment includes an element body 3, terminal electrodes 5 and 6, and a plurality of internal electrode groups 11 and 12, similarly to the multilayer ceramic capacitor C1 according to the above-described embodiment.

A difference between the multilayer ceramic capacitor C4 according to this embodiment and the multilayer ceramic capacitor C1 according to the above-described embodiment is that adjustment electrodes 17 are further included on the outermost layer in the X direction.

The adjustment electrodes 17 are arranged so as to be opposed to internal electrodes 7 arranged on the outermost layer in the X direction among a plurality of internal electrodes. That is, the adjustment electrodes 17 are arranged adjacent to the internal electrodes 7 at both ends in the X direction. One end portions of the adjustment electrodes 17 are exposed to a second main surface 3b of the element body 3. Accordingly, the adjustment electrodes 17 are connected to the terminal electrode 6. The other end portions of the adjustment electrodes 17 are located inside the element body 3 and are not exposed to the first main surface 3a. That is, the adjustment electrodes 17 are not connected to the terminal electrode 5.

The adjustment electrodes 17 have a polarity different from that of the internal electrodes 7. Accordingly, capacitance is caused between the internal electrodes 7 and the adjustment electrodes 17 opposed to each other. Different polarity opposed regions 20A causing capacitance are located between the internal electrodes 7 and the adjustment electrodes 17 opposed to each other. The adjustment electrodes 17 have a function of finely adjusting capacitance of the multilayer ceramic capacitor C4 in a stacking process.

Intervals between the adjustment electrodes 17 and the internal electrodes 7 adjacent thereto in the X direction are the same as intervals between the internal electrodes 7 and 9 arranged at the same intervals in the X direction. In other words, the plurality of internal electrodes 7 and 9 and the adjustment electrodes 17 arranged inside the element body 3 are all arranged at the same intervals in the X direction.

Thus, in the multilayer ceramic capacitor C4 according to this embodiment, it is possible to suppress occurrence of cracks while maintaining desired capacitance, as in the first embodiment.

According to the multilayer ceramic capacitor C4 of this embodiment, capacitance is caused between the internal electrodes 7 and the adjustment electrodes 17 opposed to each other. Accordingly, the multilayer ceramic capacitor C4 with finely adjusted capacitance is obtained.

In place of or in addition to the adjustment electrodes 17, adjustment electrodes that are arranged so as to be opposed to the internal electrodes 9 arranged on the outermost layer in the X direction among the plurality of internal electrodes, and that are connected to the terminal electrode 5 and are not connected to the terminal electrode 6 may be included. In this case, the adjustment electrodes connected to the terminal electrode 5 are opposed to the internal electrodes 9. Capacitance is caused between the internal electrodes 9 and the adjustment electrodes opposed to each other. The different polarity opposed regions 20A are located between the internal electrodes 9 and the adjustment electrodes opposed to each other.

Fifth Embodiment

Figure 11:
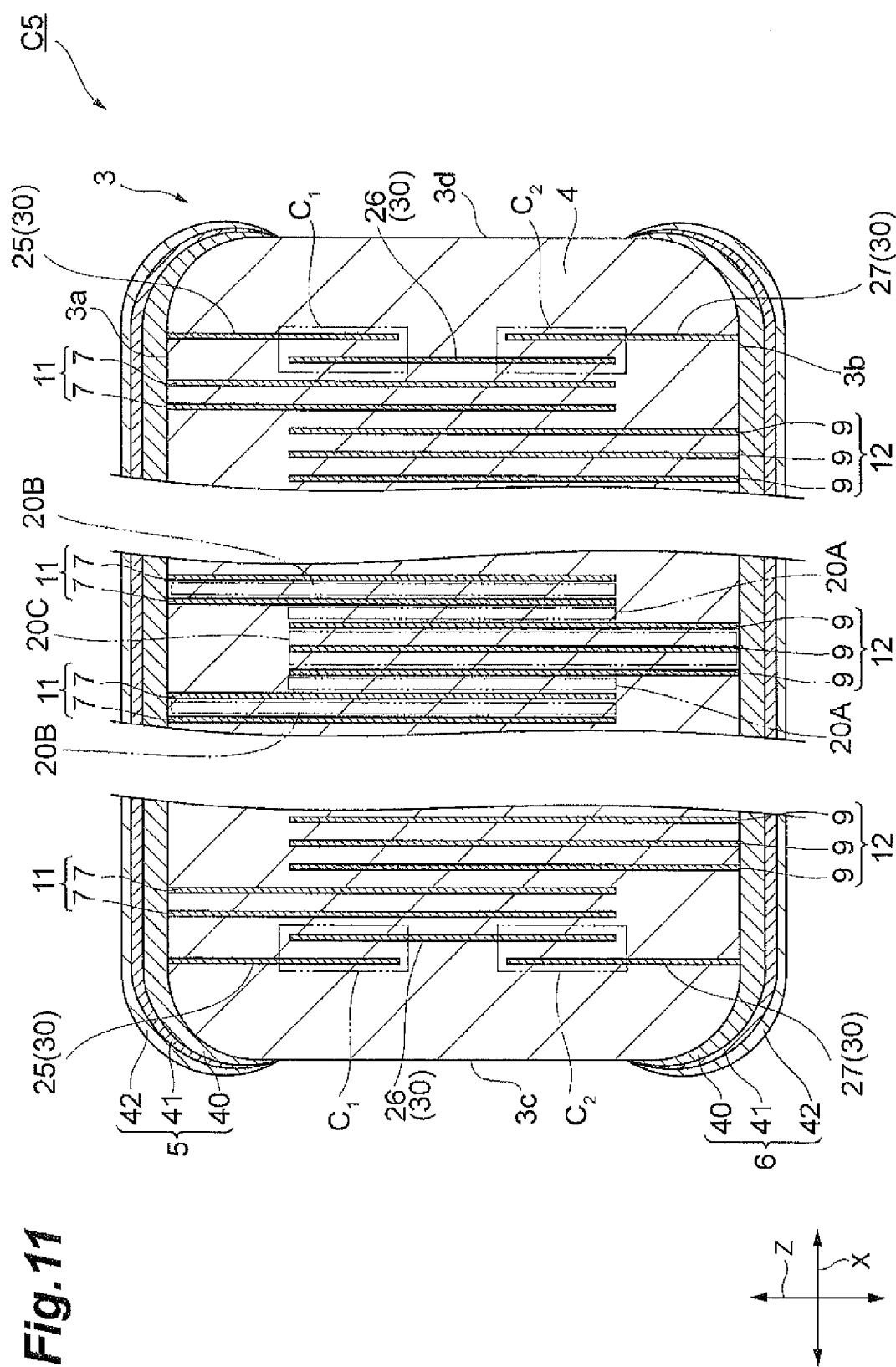
FIG. 11 is a cross-sectional view illustrating a multilayer ceramic capacitor according to a fifth embodiment.

Next, a configuration of a multilayer ceramic capacitor according to a fifth embodiment will be described with reference to FIG. 11. FIG. 11 is a cross-sectional view illustrating a multilayer ceramic capacitor according to the fifth embodiment, and is an XZ cross-sectional view corresponding to FIG. 2 in the first embodiment.

As illustrated in FIG. 11, a multilayer ceramic capacitor C5 according to this embodiment includes an element body 3, terminal electrodes 5 and 6, and a plurality of internal electrode groups 11 and 12, similarly to the multilayer ceramic capacitor C1 according to the above-described embodiment.

A difference between the multilayer ceramic capacitor C5 according to this embodiment and the multilayer ceramic capacitor C1 according to the above-described embodiment is that the multilayer ceramic capacitor C5 further includes a plurality of adjustment electrodes 30 arranged with a dielectric 4 interposed therebetween such that a plurality of capacitive components connected in series between the terminal electrode 5 and the terminal electrode 6 are made on the outermost layer in the X direction. The plurality of adjustment electrodes 30 are opposed to the internal electrodes 7 arranged on the outermost layer in the X direction among the plurality of internal electrodes. That is, the plurality of adjustment electrodes 30 are arranged adjacent to the internal electrodes 7 at both ends in the X direction.

The adjustment electrodes 30 include main electrodes 25, main electrodes 27, and intermediate electrodes 26. The main electrodes 25 on the outermost layer in the X direction are arranged so as to be opposed to the internal electrodes 7 through the intermediate electrodes 26. One end portions of the main electrodes 25 are exposed to the first main surface 3a of the element body 3. Accordingly, the main electrodes 25 are connected to the terminal electrode 5. The other end portions of the main electrodes 25 are located inside the element body 3, and are not exposed to the second main surface 3b. That is, the main electrodes 25 are not connected to the terminal electrode 6.

The main electrodes 27 are arranged in the same layer as the main electrodes 25 in the X direction. That is, the main electrodes 27 on the outermost layer in the X direction are arranged so as to be opposed to the internal electrodes 7 through the intermediate electrodes 26. One end portions of the main electrodes 27 are exposed to the second main surface 3b of the element body 3. Accordingly, the main electrodes 27 are connected to the terminal electrode 6. The other end portions of the main electrodes 27 are located inside the element body 3 and are not exposed to the first main surface 3a. That is, the main electrodes 27 are not connected to the terminal electrode 5.

The intermediate electrodes 26 are arranged between the main electrodes 25 and 27 and the internal electrodes 7 opposed to the main electrodes 25 and 27 in the X direction. Both end portions of the intermediate electrodes 26 are located inside the element body 3 and are not exposed to the first main surface 3a and the second main surface 3b. That is, the intermediate electrodes 26 are not connected to either of the terminal electrodes 5 and 6.

The main electrodes 25 and 27 and the intermediate electrodes 26 are arranged to are opposed to each other with the dielectric 4 interposed therebetween. The main electrodes 25 and the main electrodes 27 share the intermediate electrodes 26. First capacitive components $C_1$ are constituted in regions in which the main electrodes 25 and the intermediate electrodes 26 are opposed to each other. Second capacitive components $C_2$ are constituted in regions in which the main electrodes 27 and the intermediate electrodes 26 are opposed to each other. Accordingly, the first capacitive components $C_1$ and the second capacitive components $C_2$ connected in series are constituted between the main electrodes 25 and the main electrodes 27. That is, the plurality of capacitive components connected in series are constituted between the terminal electrode 5 and the terminal electrode 6.

Thus, in the multilayer ceramic capacitor C5 according to this embodiment, it is possible to suppress occurrence of cracks while ensuring a desired capacitance, as in the above-described embodiments.

According to the multilayer ceramic capacitor C5 in this embodiment, the plurality of capacitive components (the first capacitive components $C_1$ and the second capacitive components $C_2$) connected in series are constituted on the outermost layer in the X direction. Accordingly, the multilayer ceramic capacitor C5 with finely adjusted capacitance can be obtained.

While various embodiments of the present invention have been described above, the present invention is not limited to the above-described embodiments. The present invention may be modified within a range not changing the gist defined in the claims, or may be otherwise applied.

While the plurality of internal electrodes 7 and 9 and the adjustment electrodes 17 arranged inside the element body 3 have all been arranged at the same intervals in the above-described embodiment, the same interval is not limited to exactly the same interval. As described above, the same interval may have, for example, a value with a small difference, a manufacturing error, or the like within a preset range.

As long as the effects of the present invention are achieved, the arrangement in the X direction of the respective internal electrodes is not limited to the arrangement in the above-described embodiment. For example, the numbers of internal electrodes 7 and 9 in the internal electrode groups 11, 12, 31, 32, 33, and 34 are not limited to two or three.

The multilayer ceramic capacitor according to the second and third embodiments may include the adjustment electrodes 17 and 30.

According to the multilayer ceramic capacitor in the above-described embodiment, the length W in the Y direction of the element body 3 is greater than the length T in the X direction of the element body 3. In a normal multilayer ceramic capacitor, a length in the Y direction of the element body is greater than a length in the X direction of the element body, and terminal electrodes are arranged on the third side surface and the fourth side surface opposed to each other in the Y direction. Accordingly, a mounting area of the multilayer ceramic capacitor according to the above-described embodiment can be the same as that of such a typical multilayer ceramic capacitor.

What is claimed is:

1. A multilayer ceramic capacitor, comprising:
an element body including a dielectric;
a first terminal electrode and a second terminal electrode; and
a plurality of first internal electrode groups and a plurality of second internal electrode groups,
wherein the element body includes a first main surface, a second main surface, a first side surface, a second side surface, a third side surface, and a fourth side surface,
the first main surface and the second main surface extend in a first direction and a second direction intersecting the first direction, and are opposed to each other,
the first side surface and the second side surface extend in the second direction and in a third direction that is a direction in which the first main surface and the second main surface are opposed to each other to connect the first main surface and the second main surface, and are opposed to each other, and
the third side surface and the fourth side surface extend in the first direction and the third direction to connect between the first main surface and the second main surface, and are opposed to each other,
the first terminal electrode is arranged on the first main surface,
the second terminal electrode is arranged on the second main surface,
the plurality of first internal electrode groups each include a first number of first internal electrodes, and the first numbers of first internal electrodes are connected to the first terminal electrode and arranged in the first direction inside the element body,
the plurality of second internal electrode groups each include a second number of second internal electrodes, and the second numbers of second internal electrodes are connected to the second terminal electrode and arranged in the first direction inside the element body,
a length in the first direction of the element body is greater than a length in the third direction of the element body and is smaller than or equal to a length in the second direction of the element body,
a length in the second direction of the first internal electrodes is greater than a length in the third direction of the first internal electrodes, and a length in the second direction of the second internal electrodes is greater than a length in the third direction of the second internal electrodes,
the first number and the second number are different integers equal to or greater than 2,
intervals in the first direction between the first internal electrodes included in the first internal electrode groups, intervals in the first direction between the second internal electrodes included in the second internal electrode groups, and intervals in the first direction between the first internal electrodes included in the first internal electrode groups and the second internal electrodes included in the second internal electrode groups are all the same, and
the first internal electrode groups and the second internal electrode groups are arranged alternately in the first direction so that one of first internal electrodes included in each of the first internal electrode groups and one of second internal electrodes included in each of the second internal electrode groups are opposed to each other in the first direction.

2. A multilayer ceramic capacitor, comprising:
an element body including a dielectric;
a first terminal electrode and a second terminal electrode; and a plurality of first internal electrode groups, a plurality of second internal electrode groups, a plurality of third internal electrode groups, and a plurality of fourth internal electrode groups,
wherein the element body includes a first main surface, a second main surface, a first side surface, a second side surface, a third side surface, and a fourth side surface,
the first main surface and the second main surface extend in a first direction and a second direction intersecting the first direction, and are opposed to each other,
the first side surface and the second side surface extend in the second direction and in a third direction that is a direction in which the first main surface and the second main surface are opposed to each other to connect the first main surface and the second main surface, and are opposed to each other,
the third side surface and the fourth side surface extend in the first direction and the third direction to connect the first main surface and the second main surface, and are opposed to each other,
the first terminal electrode is arranged on the first main surface,
the second terminal electrode is arranged on the second main surface,
the plurality of first internal electrode groups each include a first number of first internal electrodes, and the first numbers of first internal electrodes are connected to the first terminal electrode and arranged in the first direction inside the element body,
the plurality of second internal electrode groups each include a first number of second internal electrodes, and the first numbers of second internal electrodes are connected to the second terminal electrode and arranged in the first direction inside the element body,
the plurality of third internal electrode groups each include a second number of first internal electrodes, and the second numbers of first internal electrodes are connected to the first terminal electrode and arranged in the first direction inside the element body,
the plurality of fourth internal electrode groups each include a second number of second internal electrodes, and the second numbers of second internal electrodes are connected to the second terminal electrode and arranged in the first direction inside the element body,
a length in the first direction of the element body is greater than a length in the third direction of the element body and is smaller than or equal to a length in the second direction of the element body,
a length in the second direction of the first internal electrode is greater than a length in the third direction of the first internal electrode, and a length in the second direction of the second internal electrode is greater than a length in the third direction of the second internal electrode,
the first number and the second number are different integers equal to or greater than 2,
the element body includes an inner portion, and a pair of outer portions located with the inner portion interposed therebetween in the first direction,
intervals in the first direction between the first internal electrodes included in the first internal electrode groups, intervals in the first direction between the second internal electrodes included in the second internal electrode groups, intervals in the first direction between the first internal electrodes included in the first internal electrode groups and the second internal electrodes included in the second internal electrode group, interval in the first direction between the first internal electrodes included in the third internal electrode groups, intervals in the first direction between the second internal electrodes included in the fourth internal electrode groups, and interval in the first direction between the first internal electrodes included in the third internal electrode groups and the second internal electrodes included in the fourth internal electrode groups are the same as one another,
the first internal electrode groups and the second internal electrode groups are located in the pair of outer portions,
one of first internal electrodes included in each of the first internal electrode groups and one of second internal electrodes included in each of the second internal electrode groups are arranged alternately in the first direction so as to be opposed to each other in the first direction,
the third internal electrode groups and the fourth internal electrode groups are located in the inner portion, and
one of first internal electrodes included in each of the third internal electrode groups and one of second internal electrodes included in each of the fourth internal electrode groups are arranged alternately in the first direction so as to be opposed to each other in the first direction.

3. The multilayer ceramic capacitor according to claim 2, wherein the first number is at least one larger than the second number.

4. The multilayer ceramic capacitor according to claim 2, wherein the second number is at least one larger than the first number.

5. The multilayer ceramic capacitor according to claim 1, further comprising:
an adjustment electrode that is opposed to the first internal electrode located on the outermost layer in the first direction among the first number of first internal electrodes, and that is connected to the second terminal electrode and is not connected to the first terminal electrode.

6. The multilayer ceramic capacitor according to claim 2, further comprising:
an adjustment electrode that is opposed to the first internal electrode located on the outermost layer in the first direction among the first number of first internal electrodes, and that is connected to the second terminal electrode and is not connected to the first terminal electrode.

* * * * *